US012748806B2

(12) United States Patent
Miller et al.

(10) Patent No.: US 12,748,806 B2
(45) Date of Patent: Sep. 29, 2026

(54) METHODS AND SYSTEMS FOR AUTOMATICALLY GENERATING QUERIES AND DISPLAYING VISUAL REPRESENTATIONS OF QUERY RESULTS USING GRAPHICS PROCESSING UNITS

(71) Applicant: Pluto Inc., West Hollywood, CA (US)

(72) Inventors: Louis Edward Miller, Nazareth, PA (US); Francis J. Olearczyk, Boca Raton, FL (US); Chenxin Ji, Hacienda Heights, CA (US); Chaoyu Xiang, West Hollywood, CA (US); Valeriia Tyshchenko, Agoura Hills, CA (US); Liam David York, Boston, MA (US); Connor Fahy, San Jose, CA (US); Renita Beatrice Wenceslao Alcordo, San Francisco, CA (US)

(73) Assignee: Pluto Inc., West Hollywood, CA (US)

( * ) Notice: Subject to any disclaimer, the term of this patent is extended or adjusted under 35 U.S.C. 154(b) by 0 days.

(21) Appl. No.: 18/497,731

(22) Filed: Oct. 30, 2023

(65) Prior Publication Data

US 2025/0139160 A1 May 1, 2025

(51) Int. Cl.

| | |
|---|---|
| ***G06F 16/732*** | (2019.01) |
| ***G06F 16/78*** | (2019.01) |
| ***G06F 40/40*** | (2020.01) |
| ***H04N 21/258*** | (2011.01) |

(52) U.S. Cl.

CPC ........ *G06F 16/732* (2019.01); *G06F 16/7867* (2019.01); *G06F 40/40* (2020.01); *H04N 21/25891* (2013.01)

(58) Field of Classification Search

None

See application file for complete search history.

(56) References Cited

U.S. PATENT DOCUMENTS

| | | | | |
|---|---|---|---|---|
| 12,002,470 | B1 * | 6/2024 | Gelfenbeyn | G10L 15/30 |
| 2016/0125029 | A1 * | 5/2016 | Damm | G06F 16/9535 707/722 |
| 2018/0052851 | A1 * | 2/2018 | Lewis | H04N 21/431 |
| 2018/0243655 | A1 | 8/2018 | Hughes et al. | |
| 2019/0266185 | A1 * | 8/2019 | Rao | H04N 21/4758 |

(Continued)

*Primary Examiner* — Giuseppi Giuliani

(74) *Attorney, Agent, or Firm* — Knobbe, Martens, Olson & Bear LLP

(57) ABSTRACT

An aspect relates to determining if a request received from a user device is sufficiently similar to a cached request, wherein the request requesting an identification of streamable content meeting one or more criteria. The determination comprises comparing a vector corresponding to the received request with vectors of previously received, cached requests. If the vector corresponding to the received request is sufficiently similar to a first vector of a first previously received, cached request, then a previously generated response corresponding to the first previously received, cached request may be accessed and transmitted to the user device. If a sufficiently similar vector is not identified, then at least a portion of the received request may be transmitted, in association with an identification of content items in a library, to an artificial intelligence learning engine. The response from the artificial intelligence learning engine may be transmitted to the user device.

17 Claims, 17 Drawing Sheets

(56) References Cited

U.S. PATENT DOCUMENTS

| | | | | |
|---|---|---|---|---|
| 2021/0193121 | A1 | 6/2021 | Li | |
| 2021/0402307 | A1 | 12/2021 | Thormann | |
| 2023/0020886 | A1 | 1/2023 | Mahapatra et al. | |
| 2023/0074406 | A1 | 3/2023 | Baeuml et al. | |
| 2023/0083512 | A1 | 3/2023 | Newman et al. | |
| 2023/0197070 | A1 | 6/2023 | Byrne et al. | |
| 2023/0245651 | A1* | 8/2023 | Wang | G06N 5/022 704/275 |
| 2023/0259705 | A1 | 8/2023 | Tunstall-Pedoe et al. | |
| 2023/0267126 | A1* | 8/2023 | Frieder | G06F 16/3349 707/748 |
| 2023/0289784 | A1 | 9/2023 | Khan | |
| 2024/0126794 | A1* | 4/2024 | Cook | H04L 51/02 |
| 2024/0330343 | A1* | 10/2024 | Xie | G06F 16/3344 |
| 2024/0345753 | A1* | 10/2024 | Wang | G06F 3/067 |
| 2024/0395261 | A1* | 11/2024 | Li | G10L 13/02 |
| 2025/0104693 | A1* | 3/2025 | Papayiannis | G10L 13/10 |

* cited by examiner

METHODS AND SYSTEMS FOR AUTOMATICALLY GENERATING QUERIES AND DISPLAYING VISUAL REPRESENTATIONS OF QUERY RESULTS USING GRAPHICS PROCESSING UNITS

INCORPORATION BY REFERENCE TO ANY PRIORITY APPLICATIONS PATENT

Any and all applications for which a foreign or domestic priority claim is identified in the Application Data Sheet as filed with the present application are hereby incorporated by reference under 37 CFR 1.57.

BACKGROUND OF THE INVENTION

Field

The present disclosure is related to content streaming over a network.

Description of the Related Art

Streaming media has become an important mechanism for delivering video content to users. However, streaming content is conventionally static in nature. Further, the navigation interfaces conventionally used to find an item of desired content may require navigation through many screens in a non-intuitive, compute-intensive manner. It has been technically challenging to provide dynamic content and to provide a mechanism to efficiently search for and identify content of interest in large libraries of content.

Figure 1:
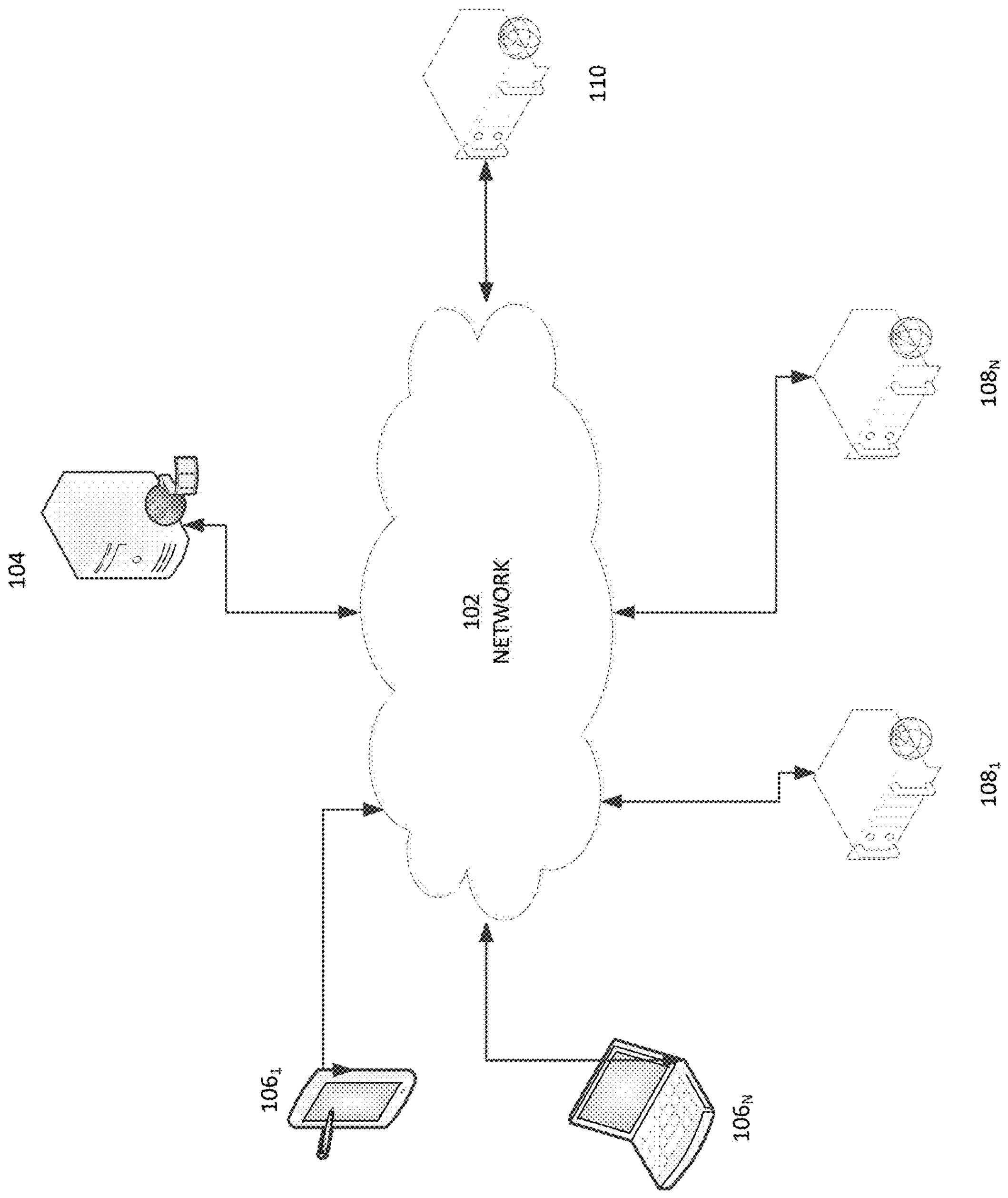
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

The present disclosure describes systems and processes that overcome the above described technical problems as well as the drawbacks of conventional approaches to searching for and generating streaming content to user devices. It is understood that the various aspects disclosed herein may be utilized together (e.g., via common system(s)) or separately.

As discussed above, conventionally, streaming content is static, in that users are streaming content that has not been optimized or customized (e.g., based on user characteristics) for a given user. Further, conventionally, certain content may be in a form that is difficult and time consuming for a user to consume.

One reason that user-specific customized streaming content has not been generally generated is that conventionally the creation of such customized streaming content requires enormous computer resources, including processor, memory, and network resources. In addition, generating customized content using conventional techniques is very time consuming and such techniques are not suitable for time sensitive content.

Further, conventionally, content recommendations typically are typically simplistic. For example, conventionally a content recommendation may simply identify in a list a number of the currently most popular content items or a certain number of the newest content items, where the list simply provides the title and an image corresponding to the content item. The user typically will navigate through multiple screens and user interfaces, scrolling up and down and left to right) in an attempt to identify a content item of interest. This is especially computer-resource intensive and time consuming with respect to very large libraries of video content items and requires significant network bandwidth to transfer the data and content for the user interfaces.

One reason that more sophisticated content recommendations have not been provided is that a given content library may include thousands of content items, where the content library may be constantly changing. Conventionally, the creation of more sophisticated content recommendations in real time, as the content library is changing (with new content items added, and other content items deleted) would take an inordinate amount of time and require enormous computer resources, including processor, memory, and network resources.

In order to overcome the foregoing technical challenges, learning engines, such as large language models (LLMs), may be employed to generate sophisticated user-specific customized content in substantially real time. The output of the LLM may comprise text output. The LLM-generated text may then optionally be fed to a text-to-speech engine to generate audible speech content which may be streamed to a user device. Optionally, the audible speech content may be fed to a voice-to-video engine to generate a video content of an entity (e.g., a computer generated avatar (e.g., a two dimensional or three dimensional avatar) or a deepfake of a real person) “speaking”/“reading” the audio content in a text-to-video modeling process, where the speaker’s mouth/lips and facial expressions may be synchronized with the audio (e.g., via lip and/or expression syncing). Text-to-video generation techniques involve generating coherent and visually meaningful sequences of frames based on textual input.

For example, optionally, the LLM-generated text may be input to a Latent Diffusion Model (LDM) to generate video content. The LDM provides an efficient text-to-video generation method based on a pretrained text-to-image generation model that includes an autoencoder and a U-Net diffusion model. The U-Net in stable diffusion inputs encoded text (plain text processed into a format it can understand) and a noisy array of numbers as inputs. Over several iterations, the U-Net produces an array containing imageable information from this noisy array it received. The output of the U-Net is then used by a decoder network to create corresponding images as output.

Learning a video diffusion model in the latent space is significantly more efficient than in the pixel space (although learning in pixel space may be utilized). For example, a low-resolution video may be generated followed by a sequence of frame interpolation and generation of high-resolution models. In particular, an LDM may compress high-quality data into a lower-dimensional space and then create videos in the lower-dimensional space. The resulting "video" may be "decompressed" so that the "video" of latent representations is decompressed back into videos. This enables the creation of high-quality videos without the need for excessive computing power.

Other optional text-to-video generation techniques include the following.

Conditional Variational Autoencoders (CVAEs), may be used to generate video sequences conditioned on textual inputs. The textual input guides the generation process, enabling the model to produce coherent videos that match the provided descriptions. For example, the textual description may be encoded using a neural network component. This encoded representation may then combined with the sampled latent variable (mean and variance) from the latent space. During the generation phase, a textual description is input into the encoder, producing a distribution in the latent space. A point is then sampled from this distribution in the latent space, and the sampled point is combined with the encoded textual description. The combined representation is passed through the decoder, generating a sequence of video frames that correspond to the provided text. By conditioning the generation process on the textual description, CVAEs may produce videos that are consistent with the given description. Attention mechanisms, motion modeling, and loss functions may be utilized in combination with a CWAE to enhance the quality of the generated video.

Generative Adversarial Networks (GANs) comprising generator and discriminator networks may be used to generate video from text, where a GAN generator network is trained to generate frames conditioned on textual descriptions. The generator and discriminator networks work together to produce realistic videos.

Sequence-to-Sequence Models (SMSs) may be used to encode the text and then decode it into a sequence of video frames. Sequence-to-Sequence models comprise neural networks configured to handle sequential data, such as text and time series, by mapping an input sequence to an output sequence. A Sequence-to-Sequence model includes an encoder and a decoder. The encoder takes the input sequence (the textual description) and encodes it into a fixed-size vector representation which may be referred to as the "context" or "thought" vector. The decoder then takes this context vector and generates the output sequence in the form of video frames.

Training a text-to-video model may utilize a dataset with pairs of textual descriptions and corresponding video sequences. The datasets may be curated and annotated to ensure accurate alignment between the text and the visual content.

Generally, a given model may include an encoder, a decoder, and optionally a discriminator. For example, the text input may be processed by the encoder to create a representation that captures the essence of the description. This representation serves as a guide for generating the video frames. The generator network takes the encoded text representation and generates video frames frame by frame. It may utilize recurrent or convolutional layers to generate coherent sequences. A discriminator network may optionally be used to distinguish between real and generated video frames. This adversarial interaction improves the realism of generated videos.

During training, a model's parameters are optimized to minimize/reduce the difference between the generated video frames and the ground truth frames from the dataset. Various loss functions are used, including pixel-wise differences, perceptual losses, and adversarial losses. The quality of the generated videos can be evaluated using both quantitative metrics (e.g., structural similarity index, perceptual metrics, etc.).

Certain aspects of generating content customized for a user will now be described in the context of fantasy sports although the disclosed techniques may be utilized for other types of data, including real-world sports, news, non-sport competitions, weather reports, and/or the like.

By way of illustrative example, user-specific data points may be accessed from a source, such as an online fantasy sports game, and a prompt may be generated by a prompt-generation software module. The prompt may optionally be generated using a d predefined template into which the user-specific data points may be inserted. The prompt template/format may optionally be specified by the user in whole or in part. By way of illustrative example, in accordance with a user instruction as to voice style, a prompt may instruct the LLM to generate a script in the form of a radio or television sports broadcast reporting scores for a fantasy sporting "event."

For example, a schedule may be specified at which a content generation process will request the latest data points with respect to a user's fantasy sport team/players/league. By way of illustration, the data may be requested every 15 minutes, every hour, every three hours, or other time period. The data points may then be used to generate a prompt for the LLM (or other such AI engine), which in turn may generate a script which may be textually, audibly, and/or via video (e.g., comprising an animated or deepfake talking head and comprising an audio track) presented to a user via a user device. The LLM generated content, repeatedly updated accordingly, may be reproduced via a corresponding webpage presented via a browser or via an application (an "app", such as a fantasy sports app or a streaming content app) installed on a user device, at a specified schedule, in a loop, in response to a user activating a corresponding control, and/or otherwise.

As discussed above, an aspect of the present disclosure relates to an LLM-powered chatbot configured to guide users through customized queries (e.g., via an AI-powered chatbot) that will assist in identifying content of interest with a significant reduction in user interface navigation by the user as compared to conventional approaches. The chat may be conducted via voice, text, and/or a selection of options by a user, where the options are presented via a user interface (e.g., comprising menu selections, icons, spoken options, etc.).

By way of example, a content library may contain thousands, tens of thousands, or hundreds of thousands of titles. In order to reduce the burden on processor and memory resources with respect to generating content recommendations, rather than generating recommendations from the entire content library, a specified number (e.g., 50, 100, 500 out of thousands of content items in a library) of the most popular content items in different categories/genres may be identified and they may be aggregated into a larger set of content items (e.g., 600, 1200, 6000 content items) to thereby provide a reduced set of titles as compared to the entire content library but still including a wide variety of representative content items from different categories.

A prompt may optionally be generated (e.g., using a template) into which the larger, aggregated set of content titles may be inserted. By way of illustrative example, a prompt may instruct the LLM to generate a script in the speech style of a film critic or a cartoon character. A schedule may be specified at which a process will request the current most popular content items in a set of categories/genres. By way of illustration, the data may be requested every 15 minutes, every hour, every three hours, every day, every week, or other time period. The aggregated content library titles, the style instructions, instructions to provide content recommendations, and/or other instructions may then be used to generate a prompt for the LLM, which in turn may generate a script which may be textually, audibly, and/or via video comprising an audio track presented to a user via a user device. Optionally, rather than using a subset of a content library in generating a prompt, all or substantially all of the content items in the library may be used to generate the prompt.

The LLM generated content, updated accordingly, may be reproduced via a corresponding webpage presented via a browser or via an application (an "app", such as a fantasy sports app) installed on a user device, at a specified schedule, in a loop, in response to a user activating a corresponding control, or otherwise. Advantageously, because (optionally) the prompt includes only titles of content items that actually exist in the content library, the LLM responses will be improved as they will not contain recommendations for real or imagined titles that are not in the content library and hence not available to the user via the corresponding streaming application. This overcomes the hallucinating problem currently endemic to LLMs, wherein an LLM may make up something that appears authentic.

The content recommendations may be provided as part of an artificial intelligence (e.g., LLM-powered) chat between a user and a chatbot (e.g., in response to a user request for recommendations). The chat may be conducted textually via a displayed chat user interface and/or audibly using TTS by the chatbot and using speech recognition to understand the user's speech received via a microphone. The chat may be conducted via an animated virtual assistant. The recommendations may be provided with images related to the content items (e.g., posters or frames from the content items) and/or with video previews of the recommended content items in addition to or instead of textual recommendations. The user may then select a recommended content item, which may then be streamed to or downloaded to the user's device for playback.

With respect to using a voice chat (where the user may provide verbal queries and commands), voice recognition processing may be used to convert the user's spoken language, received via a user device microphone, into text. This may comprise capturing audio input, processing it, and transcribing it into a textual format that natural processing language (NLP) models, such as a large language model, can understand. For example, voice recognition processing may be used to identify keywords or phrases that trigger specific actions or responses. By way of illustration, if the user says "Hi Pluto" this may activate the virtual voice assistant. The NLP model may process the textual input derived from the user's speech or text to understand the user's intent, sentiment, and context. This may include tokenization, part-of-speech tagging, and/or entity recognition. The NLP model may analyze the structure of sentences and extract entities (e.g., genre names, actor names, etc.). The NLP model may determine the relationships between words to comprehend the meaning. The NLP model may consider the context of the conversation (e.g., track the history of the dialogue between the virtual assistant and user) to provide relevant responses and to make conversations more coherent. Using the understanding of user input and the context, the LLM model generates a response. This response could be in the form of text or synthesized speech.

As discussed above, the prompt may be generated in response to and/or using a user query (e.g., comprising descriptors and/or key words). For example, a user may request (e.g., via a query or chatbot user interface field) suggestions for content. The request may specify a desired genre and/or content type (e.g., romantic comedy, drama, action thriller, fantasy, science fiction, documentary, foreign language, movie, series, art films, award winning films, bad movies, etc.), actor, length, release date range, newest, content similar to another item of content identified by the user (e.g., "Do you have anything like Star Wars?"), and/or other content specification. For example, the user can ask for a recommendation based on their mood that day ("show me sad or scary movies"), the theme and feel of a movie, or a movie pairing based off of their current meal (e.g., "I'm having Italian food for dinner, recommend a movie that goes well with Italian food"). Optionally, the user may simply request that a computer assistant make recommendations without specifying the type. Optionally, the prompt provided to the LLM may include information identifying content the user has recently begun watching or has recently completed watching.

Optionally, as similarly described elsewhere herein, the LLM may comprise a transformer architecture that utilizes self-attention, which enables the model to selectively focus on different parts of the input sequence during the encoding process. The transformer architecture may comprise an encoder and a decoder, connected through one or more multi-head attention and feedforward layers.

The encoder is configured to receive an input sequence and process it using multi-head self-attention, where the input sequence is transformed into a set of query, key, and value vectors. The query, key, and value vectors may be used to compute the attention scores between given positions in the sequence, enabling the model to identify the relevant (e.g., most relevant) portions of the input sequence for respective positions.

The decoder is configured to receive the encoder output and generate an output sequence. The decoder may also utilize multi-head attention and may be further configured with an additional attention mechanism that enables the decoder to attend to the encoder output and to generate the output sequence using the relevant information from the input sequence.

The transformer architecture may comprise one or more feedforward layers, which apply a linear transformation followed by a non-linear activation function to the output of the attention layers. The feedforward layers facilitate further capture patterns in the input and output sequences.

The transformer may comprise a loss function that measures the difference between the predicted output sequence and the true output sequence. The transformer is configured to minimize or reduce the loss function output. Backpropagation may be utilized as part of the minimization process, where the gradients of the loss function with respect to the model parameters are calculated and used to update the model weights (e.g., associated with neural network layers).

The LLM is trained. The training process may involve exposing the LLM to a very large and extensive corpus of text (e.g., sports broadcast scripts, film critic reviews, cartoon scripts, dialogues, conversations, newspapers, websites, articles, books, magazines, and/or the like). Through this exposure, the model learns grammar, syntax, and semantics. Through such training, the LLM learns to predict the next word(s) in a sentence or generate entire paragraphs based on the patterns it has identified in the training data.

Optionally, the LLM may be fine-tuned via the training process to provide more accurate responses. Fine tuning may comprise supplying the LLM with a list of queries and desired responses. Optionally, with respect to content recommendations, an LLM may be utilized to generate search queries, where for each content item in the library, the LLM is instructed to generate search queries that might mean a user is interested in watching that content item. A consolidation process may be performed, combining similar queries so they would result in the output of multiple responses. The resulting queries may then be used in the training process.

When a system or user interacts with an LLM, the model utilizes its learned knowledge to provide responses based on the input it receives.

Certain example aspects will now be discussed with reference to the figures. FIG. 1 illustrates an example environment. A content composer and content transmission system 104 (which may include a stitcher component, such as a server providing stitcher services or where a stitcher system may include a content composer component, or where the content composer and the stitcher may be an independent systems) is connected to a network 102 (e.g., a wide area network, the Internet, a local area network, or other network). The content composer and content transmission system 104 is configured to communicate with client devices 1061 . . . 106*n* (e.g., connected televisions, smart phones, laptops, desktops, game consoles, streaming devices that connect to televisions or computers, etc.) that comprise video players. By way of example, the video player may be embedded in a webpage, may be a dedicated video player application, may be part of a larger app (e.g., video streaming application configured to display electronic program guides, a game application, a word processing application, etc.), may be hosted by a connected television (CTV), a smart phone, a personal computer, or the like. The system 104 may be configured to provide live streaming video (e.g., of sport or news broadcast), video-on-demand (VOD) streaming content, linear, time-scheduled prerecorded streaming video content, and/or downloadable video content.

The content composer and content transmission system 104 may include or be connected to a system 110 hosting a large language model (LLM). The system 104 may include one or more graphics processing units (GPUs) and/or artificial intelligence-specific processing devices (which may be referred to as an AI processor). The CPUs and/or AI processors may be utilized to execute the LLM, for text to speech applications, and/or to generate avatars (e.g., a two dimensional or three dimensional avatar) to be used in "speaking" text generated by the LLM.

For example, a given GPU may be configured to accelerate graphics rendering and other intensive compute-tasks. The GPU may include highly parallel processors that may be used to perform artificial intelligence, machine learning, and other tasks.

The GPU may include a large number of processing units, which may be referred to as "cores" or "stream processors." The cores are configured to perform calculations in parallel, enabling the GPU to handle massive amounts of data simultaneously. The GPU may comprise a compute pipeline designed for mathematical calculations and a graphics pipeline optimized for rendering graphics and visual effects.

The GPU may comprise global memory that stores data that can be accessed by some or all the GPU cores but with higher latency compared to local memory. A given core may have its own local memory, which may be much faster to access than global memory. The local memory may be used to store frequently used data and intermediate results. The GPU may include shared memory (a small, fast memory shared among multiple cores within a group, or thread block). The shared memory may be used to facilitate efficient data sharing and communication between cores in the same block. The GPU may include texture and constant memory optimized for accessing data patterns commonly used in graphics and computational workloads.

A set of threads may be configured to execute the same instruction (but on different data elements) in a SIMD (Single Instruction, Multiple Data) fashion. This allows for instruction-level parallelism. Threads within a thread set can communicate and synchronize with each other using the shared memory.

The GPU may offload certain compute-intensive tasks from the main central processing unit (CPU) enabling the CPU to focus to perform tasks more suited to the CPU's architecture and instruction set. This specialization improves overall system performance.

In addition to or instead of using GPUs for executing the LLMs, AI-specific processors may be utilized to execute the LLMs. The AI-specific processors may be optimized to perform the computations used for artificial intelligence tasks, such as neural network-based computations used in deep learning. For example, the processors may be optimized for the specific mathematical operations involved in training and inference of neural networks.

The AI processor may optionally include matrix multiplication units configured to perform large-scale matrix multiplications efficiently. The AI processor may optionally include a vector processing unit configured to perform vectorized operations and non-linear activation functions commonly used in neural networks, such as ReLU (Rectified Linear Unit) functions. A given AI processor may include various types of on-chip memory, such as registers, high speed caches, and scratchpad memory. These memories may be used to store intermediate data and reduce the latency of memory access. The AI processor may be configured to store and access data from high-bandwidth external memory. Such data may include, by way of example, neural network weights, input data, and intermediate results. The AI processor may be configured to perform parallel operation using Single Instruction, Multiple Data (SIMD) or the like to process multiple data elements simultaneously, which is well-suited for neural network computations and thus for many of the tasks described herein. The AI processor may be configured to perform specialized instructions and operations designed for neural network computations. These instructions may be configured to accelerate neural network operations like convolution, pooling, and activation functions.

The AI processor may be configured to perform precision and mixed-precision operations. Many AI workloads can often tolerate lower precision calculations without significant loss of accuracy. In order to increase the processing speed while still providing sufficient accuracy, the AI processor may support mixed-precision operations, where certain parts of the neural network use lower precision for faster processing while maintaining acceptable accuracy.

The AI processor may offload certain compute-intensive tasks from the main central processing unit (CPU) enabling the CPU to focus to perform tasks more suited to the CPU's architecture and instruction set. This specialization improves overall system performance.

The content composer and content transmission system 104 may receive a request for media from a given client device 106 in the form of a request for a playlist manifest or updates to a playlist manifest. The content composer and content transmission system 104 may optionally determine if secondary content (which may comprise interstitial content) is to be inserted in an item of primary content (e.g., a movie, a television show, a sporting event, etc.). If secondary content (e.g., an advertisement, public service announcement, preview of an upcoming program, station identification, etc., which may be in the form of interstitial content) is to be inserted in an item of primary content, a file may be accessed indicating the location and length of a secondary content pod (e.g., a time frame reserved for interstitials, wherein one or more interstitials may be needed to fill a pod), the system 104 may determine context information (e.g., information regarding the primary content being requested, information regarding the user, and/or other context information), solicit and select secondary content from third parties, define customized secondary content, generate playlist manifests, and/or perform other functions described herein.

The content composer and content transmission system 104 and/or another system may stream requested content to the requesting client device 106. For example, the content composer and content transmission system 104 may stream content to a client device 106 in response to a request from the client device 106 made using a playlist manifest entry, or the content composer and content transmission system 104 may stream content to a client device 106 in a push manner (in the absence of a client device request). Thus, the assembly of video clips into a program or other integrated item of content may be performed on the client side by assembling a set of separate video clips accessed via a manifest. Optionally, the assembly of video clips into a program or other integrated item of content may be performed on the server-side, which may pre-stitch a plurality of clips into a single item of content, and then push the single item of content to a user device via a single video stream URL.

Optionally, the content composer and content transmission system 104 may transmit context information to one or more secondary content source systems 1081 . . . 108*n*. For example, the source systems 1081 . . . 108*n* may optionally include ad servers, and the secondary content may comprise ads. The secondary conte source systems 1081 . . . 108*n* may comply with the VAST protocol. By way of further example, the secondary content source systems 1081 . . . 108*n* may provide public service videos, previews of upcoming programs, quizzes, news, games, and/or other content. The secondary content source systems 1081 . . . 108*n* may use the context information in determining what secondary content (if any) is to be provided or offered to the requesting client device 106.

The content composer and content transmission system 104 may provide video content on a scheduled basis (including pre-recorded and live content) and/or a video-on-demand (VOD) basis to client devices 106. For example, the content composer and content transmission system 104 may provide and/or populate user interfaces presenting representations of a library of content items via a user device 106, where the user may select a given content item and the selected content item will be substantially immediately streamed to the user device as video-on-demand content.

The content composer and content transmission system 104 may provide linear scheduled video content via one or more channels (e.g., themed channels) according to a program schedule, where a given program may have a scheduled start time and end time. For example, a user interface of a program guide may be presented on a user device 106, the program guide listing channels and the start and end times of programs of a given channel over a period of time (e.g., the current time and for a period of 2 or 3 hours thereafter, where the user may be enabled to scroll further forward through the program guide). The user may select a channel (or a program associated with a channel) via the program guide, and the currently scheduled program (and associated secondary content) for that channel will be streamed to the user device at its current scheduled playback position.

Figure 2A:
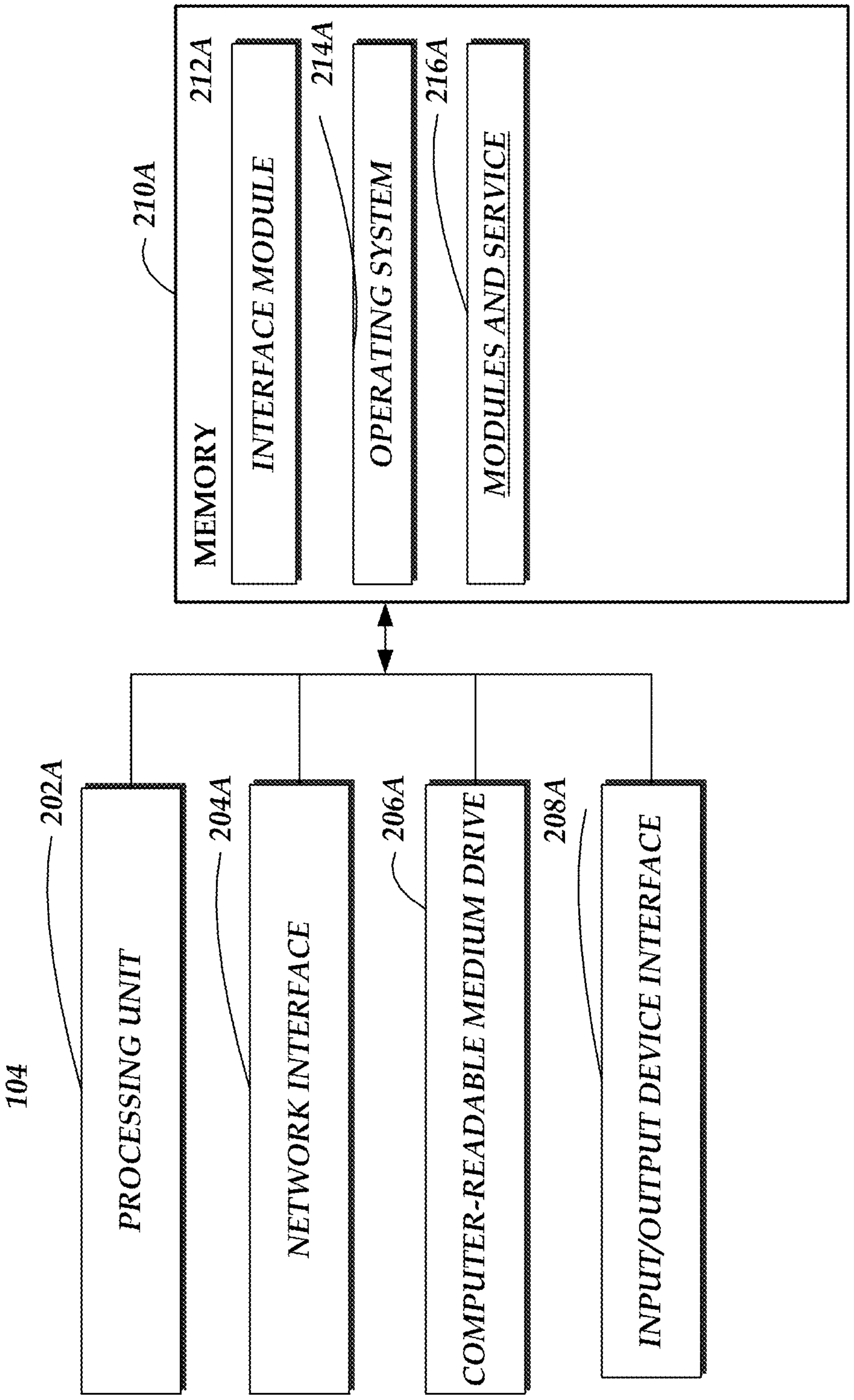
FIG. 2A is a block diagram illustrating example components of a content composer and streaming system.

FIG. 2A is a block diagram illustrating example components of a content composer and content transmission system 104. The example content composer and content transmission system 104 includes an arrangement of computer hardware and software components that may be used to implement aspects of the present disclosure. Those skilled in the art will appreciate that the example components may include more (or fewer) components than those depicted in FIG. 2A. The composer and content transmission system 104 may optionally be a cloud-based system including a hosted computing environment that includes a collection of physical computing resources that may be remotely accessible and may be rapidly provisioned as needed. Further, the composer and content transmission system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and content described herein.

As similarly discussed above, the content composer and content transmission system 104 may include one or more processing units 202A (e.g., a general purpose processor, a high speed graphics processor, a high speed AI-specific processor, an encryption processor, and/or a video transcoder), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., primary and secondary content source systems, client devices, LLM systems, etc.). The processing unit 202A may thus receive information, content, and instructions from other computing devices, systems, or services via a network, and may provide information, content (e.g., streaming video content, content item recommendations, a narration/reporting of fantasy sport events, etc.), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

The memory 210A may be utilized to cache user queries (and/or prompts comprising user queries) asking for content recommendation and query responses generated by an LLM. For example, many recommendation queries from different users (and/or prompts comprising user queries) may be the same or similar, and hence, as long as the content library does not change, the LLM responses may be the same or similar. In order to reduce the load on the LLM and to reduce corresponding computer resource utilization, a certain number of the most recent queries/prompts and/or query/prompt responses may be cached for use with multiple users. However, in order to ensure that stale recommendations are not sent to a user (where a recommendation may be stale if there have been additions or deletions to the content library), if the system 104 detects that a content library for which recommendations are to be generated, has had more than a threshold number of content deletions and/or additions have been made (e.g., where the threshold may be 1, 5, 50, or other number) to the library (or those in a set of the most popular content items), the cache may be cleared (e.g. deleted, overwritten, or logically excluded from future use) and new user queries (which may be included n a template based prompt) may sent to the LLM in response to detecting that a recommendation is to be sent to a user. For example, an LLM prompt may be generated in response to a user asking for content suggestions or in response to a user opening a content streaming app or webpage on their device.

In particular, if a user query is asking for content suggestions, text embeddings for the query may be obtained from an embeddings model (e.g., which measure the relatedness of text strings), and the embeddings may be used to query a vector database to check for similar queries other users have asked for in the past and that are cached. The vector database enables a "fuzzy search" to be performed on the meaning of a user query so the user query does not have repeat the exact words of a cached query for a cache hit.

Obtaining embeddings from the embeddings model refers to the process of extracting numerical representations (embeddings) of text or sequences using the embeddings model. These embeddings may comprise high-dimensional vectors that capture the semantic and contextual information of the input text. Thus, both the user query and the queries database entries may be represented as vectors. If a similar user query is found in the database, the corresponding recommendations may be accessed from memory (without submitting another prompt comprising a user query to the LLM service) and transmitted back to the user device for display or sound reproduction to the user.

Thus, the vector representations of the queries may be stored in the database, associating each vector with its corresponding query. When a new query is received, it may be converted into a numerical vector.

A similarity search between the new query vector and the vectors in the database may be performed to find the most similar queries. Various distance or similarity metrics may be used for this purpose, such as cosine similarity, Euclidean distance, or Jaccard similarity. A similarity threshold may be established to filter the search results. Items with similarity scores above the threshold are considered relevant and returned as results.

Optionally, to increase the search process speed, approximate nearest neighbor search algorithms (e.g., locality-sensitive hashing) may be utilized.

If all (or substantially all) of the content library titles are used to generate a prompt to be submitted to an LLM, the list of titles may be divided up into small sets of content item titles (e.g., 600, 1200, or other number) to make them more manageable. The same prompt (e.g., comprising the user's query) may be run on searches of the subsets to distill them into a much shorter list of titles based on the search results. The results may then be combined into a new library subset, which may be used to generate a final prompt. The final prompt (e.g., comprising the user query, titles, style instructions, command to only provide recommendations from the included titles, and potentially other instructions) may then be submitted to the LLM as similarly discussed above with respect to using a library subset. Optionally, descriptions of more recent titles may be added to a given subset of content item titles, so that the LLM may optionally use such more recent titles in generating recommendations.

Figure 2B:
FIG. 2B illustrates example modules and services of the content composer and streaming system.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, as similarly discussed elsewhere herein, the processing unit 202A may optionally include a general purpose processor, a plurality of GPUs, a plurality of AI processors, and/or a video codec. The processing unit 202A may include hundreds or thousands of core processors configured to process tasks in parallel. The system 104 may offload certain compute-intensive portions of the modules and services 216A (e.g., executing LLMs, transcoding and/or transrating a stream for adaptive bitrate operations, compositing, and/or the like) to one or more dedicated devices, such as a video codec (e.g., H.264 encoders and decoders), while other code may run on a general purpose processor.

The system 104 may optionally be configured to support multiple streaming and/or download protocols, may provide low latency pass-through, and may support a large number of parallel streams (e.g., HD, 4K, and/or 8K streams). As another example, the system 104 and its components can be implemented by network servers, application servers, database servers, combinations of the same, and/or the like, configured to facilitate data transmission to and from data stores, user terminals, and third party systems via one or more networks. Accordingly, the depictions of the modules are illustrative in nature.

Referring to FIG. 2B, the modules and services 216A may include modules that provide a reporting query generation service 202B, a recommendation query service 204B, and a LLM service 206B.

The reporting query generation service 202B may be configured to generate a query/prompt to the LLM, requesting the LLM to generate a narrative script regarding a fantasy sports event. For example, the query/prompt may be generated based on user-specific data points accessed from an online fantasy sports game feed or database for a user. The service may optionally utilize a template in generating the prompt into which the user-specific data points may be inserted. The prompt template/format may optionally be specified by the user in whole or in part (e.g., to further customize the generated content). By way of illustrative example, a prompt may instruct the LLM to generate a script in the form of a radio or television sports broadcast reporting scores for a fantasy sporting "event."

Optionally, the script text generated by the LLM may be converted to speech using a text-to-speech (TTS) service 208B. The TTS service 208B may be configured to analyze the input text from the LLM. For example, the TTS service 208B may segment the text into smaller units, such as words, phrases, and sentences. The TTS service 208B may also consider punctuation, capitalization, and other linguistic elements. The TTS service 208B may perform text preprocessing to improve pronunciation and prosody (the rhythm, stress, and intonation of speech). This can involve handling abbreviations, numbers, dates, and special symbols.

The TTS service 208B converts the text into phonemes, which are the smallest units of sound in a given language. For example, a pronunciation dictionary or rule-based algorithms may be used to determine the phonetic representation of a given word or part of the text. The TTS service 208B may generate prosodic information to make the synthesized speech sound more natural. The generated prosodic information may include pitch contours, duration of sounds, and variations in loudness. Acoustic models may be used to predict the sounds or waveforms corresponding to the phonemes and prosody. Machine learning techniques, such as deep learning, may be utilized to model the relationships between text and speech sounds.

The TTS service 208B may perform the waveform synthesis which represents the audio of the spoken text. For example, concatenative TTS may optionally be utilized to concatenate pre-recorded snippets of human speech to form the output. These snippets may be selected based on their phonetic similarity to the generated phonemes. Parametric TTS may be optionally utilized to generate speech waveforms using mathematical parameters. Parametric TTS may be more flexible and require less storage as compared to concatenative TTS. Neural TTS may optionally be used, comprising neural networks, such as deep learning models, to directly generate speech waveforms from text, improving the naturalness of synthesized speech.

The TTS service 208B may perform post-processing to remove artifacts, improve quality, and to ensure the output has been adequately pitch corrected and smoothed.

A video service 210B may be used to generate an avatar (e.g., a two dimensional or three dimensional avatar) or an image of a real person (e.g., a sports broadcast personality, a film critic, etc.) that appears to speak the speech generated by the TTS service 208B. For example, a video sequence may be generated that makes the computer generated avatar or person appear to lip sync the speech generated by the TTS service 208B. Optionally, the facial expressions, gestures, and body movements may be animated to make the avatar's speech more expressive and realistic. The avatar may act as a 2D or 3D virtual assistant as similarly described elsewhere herein.

A deepfake comprises synthetic media that is created using deep learning algorithms, such as deep neural networks (e.g., comprising an input layer, a plurality of convolutional hidden layers, an output layer, and/or additional layers). Deep learning involves training artificial neural networks with large amounts of data to perform tasks. The deepfake algorithms may be used to manipulate or generate fake content in the form of videos and/or audio recordings. Deepfakes can be created by training a neural network on a dataset of real videos or audio clips and then using that network to generate content that appears real but is actually fabricated. This technology may be used to manipulate facial expressions, alter voices, and create realistic looking but entirely fictional scenes.

The foregoing LLM-generated script, speech file, and/or avatar file may be stored in memory for later access and playback by a user device (e.g., via a player accessed via a webpage or via an app installed on the user device). For example, with respect to the generation of a fantasy sport reporting script, the generated content may be automatically played to the user via the user device on a predetermined schedule, in a continuous loop, in response to a user opening a fantasy sports application or webpage, and/or in response to a user request (e.g., issued via activation of a corresponding control, a speech command, a hand gesture, or otherwise). The content may be periodically regenerated and/or may be regenerated in response to a detected event (e.g., a player trade, a drafting event, etc.). Optionally, secondary content, such as an advertisement, public service announcement, or the like (which may comprise text, audio, and/or video content) may be played just preceding, just after, or during the generated content.

Fantasy sports involve many actions and events, which may be included in a given LLM-generated script. As will be described, the actions and events that may be reported by the LLM may include a new roster, assignment of athletes to positions, points earned, trades, transactions, free agencies, waivers, scores at the end of scoring periods, playoff and championship game results, prizes and payouts, statistics and updates, keeper league activities, and/or fantasy sports social media postings.

By way of background, participants may select a roster of athletes during a draft from the available pool, adhering to salary caps or player constraints in certain instances. The roster selection may be included in the LLM-generated script. Players are assigned positions (e.g., quarterback, running back, wide receiver in fantasy football, pitcher, shortstop, catcher, etc. In fantasy baseball). Such position assignments may be included in the LLM-generated script.

A given fantasy league may have scoring rules that assign point values to various statistical achievements by the athletes. By way of example, scoring rules for earning points may include factors such as touchdowns, yards gained, goals scored, assists, rebounds, and the like for fantasy football. By way of additional example, with respect to fantasy baseball, scoring rules for earning points may include factors such as hits, home runs, runs batted in (RBIs), stolen bases, and runs (for batters) and pitchers may earn points for stats like innings pitched, wins, saves, and strikeouts. The earned points may be included in the LLM-generated script.

Fantasy leagues can operate in different formats. In head-to-head leagues, fantasy teams compete against one another each week, with the team scoring the most points winning that week's matchup. In rotisserie-style leagues, teams accumulate points over the course of a season, and rankings are based on cumulative statistics. The results of team scoring for each league a user is participating in (e.g., as a manager) may be included in the LLM-generated script.

Certain fantasy sports software platforms may provide recommendations on what players to trade for, what position players should be assigned and/or the like. The LLM-script may provide such recommendations and may, for past recommendations that the user did not follow, recapitulate those recommendations, indicate that the user did not follow the recommendations and indicate what was the result of not following the recommendations, and what would have been the result if the user followed the recommendations.

In many fantasy sports leagues, participants can trade players with other teams. Trades are subject to league rules and often involve negotiations between team managers. Trades can add a strategic element to fantasy sports, allowing managers to strengthen their teams by acquiring high-performing players. Such trades may be included in the LLM-generated script.

Players who are not drafted or who become available due to injuries or other factors can often be picked up by fantasy managers through free agency or waiver processes. These transactions may be subject to rules that prevent excessive roster churning. Such availability of free agents and free agent transactions may be included in the LLM-generated script.

Fantasy sports leagues typically have defined scoring periods, such as weekly matchups or a full season. At the end of each scoring period, the team with the most points wins. Such scores at the end of each scoring period may be included in the LLM-generated script.

Many fantasy leagues have playoff rounds toward the end of the sports season, mimicking the real-world playoffs. Teams that perform sufficiently well during the regular season may advance to compete for the league championship. The results of advancement to the playoffs and the results of the playoff games and championship may be included in the LLM-generated script.

Some fantasy sports leagues may collect entry fees, and winners may receive cash prizes or other rewards. The award of such prizes and rewards may be included in the LLM-generated script.

Fantasy managers may rely on real-time updates and statistics from sports news outlets or league-provided platforms to track their team's performance and to make strategic decisions. Such updates and statistics may be included in the LLM-generated script.

In some fantasy sports leagues, participants can keep a certain number of players from their previous season's roster, adding a long-term strategic element to team management. The identification of "keepers" may be included in the LLM-generated script.

Online forums, chat groups, and social media platforms are commonly used for discussions regarding fantasy sports. Portions of such discussions may be selected and may be included in the LLM-generated script.

With respect to fantasy sports, a given item of LLM-generated content may include a summary of some or all of the foregoing events and information for different time periods in a sports season including but not limited to a full season of activity, a completed period of competition (e.g., a week), a prior day's activity, and/or the most recent game specific events to provide an update within a day. The prompt may optionally be submitted to the LLM in real time, such as in response to a user request or an application request for a given report. Optionally, if the user activates a "continuous report update" control or the like, the prompt may be submitted to the LLM with high frequency (e.g., every 5 minutes, every 15 minutes, every 30 minutes and/or the like) and the LLM response may be accordingly transmitted to the user device, where the continuous prompt submissions may be halted in response to a user instructions (e.g., activation of a "stop continuous report update," or the like), the user closing the fantasy sports application, and/or after a period of time (e.g., after 1 hour, 2 hours, 4 hours, or other specified time period). Thus, for example, a user can request that updates regarding a game be provided every 15 minutes, and the prompt may accordingly be submitted to the LLM every 15 minutes and the LLM may be transmitted to the user device every 15 minutes.

Optionally, the LLM may be used to generate content scripts using league specific data for a given league including results of competitions, recent transactions in the league, best available free agent players, player injury reports, recent news updates on players for the user's rostered players, an identification of players performing very well or very poorly, breaking news, an identification of managers who have not yet paid their league dues, live/real time player draft/auction coverage (e.g., good draft picks, bad draft picks, slow picker callout, humorous comments, last minute lineup changes, reminders (e.g., early locks, keeper deadlines, etc.), promotional content, who should be started report, etc.).

As similarly discussed elsewhere herein, users (e.g., fantasy sports game players) may optionally be provided with user interfaces via which the user may specify (e.g., via menu selections) various options to customize their experience. The system 104 may then cause the content to be so customized.

For example, the user interface may enable the user to specify a desired voice and/or accent and/or company personality, an audio speed, and/or a content length (e.g., a length of audio and/or video content generated using an LLM-generated script). The prompt may be configured to cause the LLM to generate a recap providing the desired data in a fluid, natural language manner.

The prompt may be generated using a template with insertion points for various data some or all of which may be specific to a given user. For example, the template may include "pretend you are a sports radio personality named "[CURRENT POPULAR SPORTSCASTER]" working for "CBS Fantasy Sports Radio" reading the following scores from a baseball game in week [insert week number of the season in the league called [insert league name]]. Different templates may be selected and used for different report types and/or for different users. For example, there may be a template for recapping the previous week's team performance, and there may be another template configured to focus on an individual player and the player's statistics. The templates may be of different lengths and have different numbers of and locations for data points.

In order to better ensure that the script generated for a given sport is accurate and natural, the prompt may provide corresponding specific instructions to the LLM, such as "Refer to scores as 'points' instead of 'runs'." The prompt may specify a length for the report, where the length may be specified in words, characters (e.g., Keep the response under 2500 characters long), time to read, or otherwise. The specified length may be customized for different users (e.g., based on a user-specified length and/or user viewing history), where a determination may be made as to how long the user typically views/plays back the LLM generated report.

Following is an example prompt that may be generated by the system 104 and provided to the LLM service 206B.

Start pretend you are a sports radio personality named "Charlie O'Brien" working for "CBS Fantasy Sports Radio" reading the following scores from a baseball game in week 11 of the season in the league called "SPLN Fantasy Baseball": Boognish 252 vs GTF Troutta Here 246, Cache King 159 vs Ballbusters 265, Mudbugs 224 vs Schwing Batter Batter 226, Stunners 234 vs Gashouse Gorillas 192, Florida Braves 325 vs Lock It Up 248, Call Me Homie 216 vs Bustelo 340. Refer to scores as "points" instead of "runs". Keep the response under 2500 characters long.

"===END==================================="

Following is an example narrative output from the LLM service 206B in response to the above example prompt:

"===START=================================="

Welcome back to CBS Fantasy Sports Radio! I'm your host, Charlie O'Brien, bringing you all the exciting action from Week 11 of the SPLN Fantasy Baseball league. Let's dive right into the scores:

In our first matchup, Boognish took on GTF Troutta Here. Boognish put up a solid performance, scoring 252 points, but GTF Troutta Here wasn't far behind, with 246 points. Boognish held on for a narrow victory.

Cache King faced off against the Ballbusters, and it was the Ballbusters who dominated the game. They amassed an impressive 265 points, leaving Cache King with 159 points. The Ballbusters claimed a convincing win.

The Mudbugs and Schwing Batter Batter battled it out in a close contest. The Mudbugs fought hard, scoring 224 points, but Schwing Batter Batter had the edge with 226 points, securing a thrilling victory.

The Stunners took on the Gashouse Gorillas, and it was the Stunners who came out on top. They showcased their offensive prowess, scoring 234 points, while the Gashouse Gorillas managed 192 points. The Stunners secured a comfortable win.

Next up, we had the Florida Braves going head-to-head against Lock It Up. The Florida Braves dominated the game, piling up an impressive 325 points, while Lock It Up scored 248 points. The Florida Braves cruised to a commanding victory.

In our final game of the week, Call Me Homie battled it out with Bustelo. Bustelo unleashed an offensive onslaught, scoring a whopping 340 points, overpowering Call Me Homie's 216 points. Bustelo emerged as the victors in a high-scoring affair.

That wraps up the scores from Week 11 of the SPLN Fantasy Baseball league on CBS Fantasy Sports Radio. Stay tuned for more thrilling updates and scores. I'm Charlie O'Brien, signing off!

===End==================================="

The foregoing LLM service output may be converted to audible speech, and an avatar (e.g., a two dimensional or three dimensional avatar) or image of a real person may be animated so as to lip-sync the audible speech as similarly described elsewhere herein.

With respect to content recommendations, the recommendation query service 204B may be configured to generate a prompt (using a user query) to be provided to the LLM service 206B. As discussed elsewhere, the prompt may be generated in response to receiving a user request for content recommendations. By way of further example, as similarly discussed above, with respect to generating content recommendations, a number (e.g., 50, 100, 500) of the most popular content items in different categories/genres may be identified and they may be aggregated into a larger set of content items (e.g., 600, 1200, 6000 content items). A prompt by the recommendation query service 204B may optionally be generated using a template into which the larger set of content may be inserted. Following is an example prompt that may be provided to the LLM services 206B by the recommendation query service 204B via an application programming interface (API).

"titles: {600 titles}

That's the end of the library of shows and movies you can use.

Answer in the voice of an old timey cartoon character and always put the titles of films in quotes. And please, only use films or shows from the above list-don't use anything else!"

Optionally, user input may be added to the prompt. For example, as similarly discussed above, a user may specify via a user interface a desired voice and/or accent and/or company personality, an audio speed, and/or a content length. Such specification may be included in the prompt so that the LLM service 206B will generate a response accordingly.

As similarly discussed above with respect to generating a fantasy sport reporting script, when the LLM service 206B response to a content recommendation prompt is received, the system 104 may parse any text in quotes (which correspond to title names) and may use the corresponding text to search the aggregated set of content (e.g., 600 content titles) for a matching title. The matching titles may be added to a content suggestion list.

The response may optionally be added to a Conversation object so further queries from the user will contain the response information in the conversation. The recommendations may be provided textually, with images related to the content items (e.g., posters or frames from the content items) and/or with video previews of the recommended content items accessed from a data store. The user may select a presented recommended content item, which may then be streamed to or downloaded to the user's device for playback. For example, the textual recommendations generated by the LLM service 206B may be converted to speech using the TTS 206B as similarly described above. In addition, an avatar or deepfake may be generated to lip sync the speech using the video services 210B as similarly described above.

Figure 3:
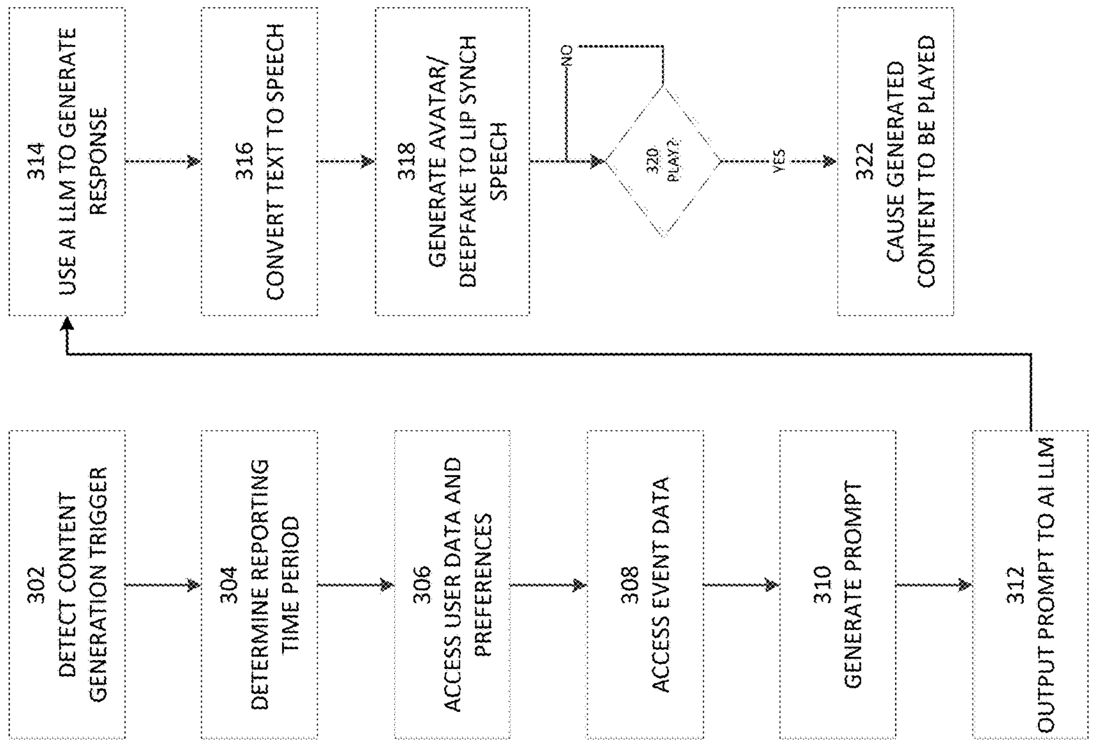
FIG. 3 illustrates an example process for generating content.

FIG. 3 illustrates an example process of generating customized content for a user, such as for a fantasy sport that the user is participating in. The process may be executed in whole or in part via the systems disclosed herein, such as the content composer and content transmission system 104, the system 110 hosting the LLM, etc. At block 302, a content generation trigger is detected. The trigger may be a scheduled trigger (e.g., every day after the conclusion of the latest real game, such as 1 AM), may be the user launching an application (such as a fantasy sports application which also may provide other sports-related data), the user accessing a fantasy sport webpage, receiving a user request for such content, or otherwise.

At block 304, a determination may be made as to the reporting period that is to be specified in the prompt to the AILLM. For example, the reporting period may be from the last time reporting content has been provided to the user, the previous 24 hours, the previous day, the previous week, from the beginning of the season to the current time, when scores become official, and/or other period. At block 306, user data and preferences may be accessed from the user's profile. Such user preferences may be a desired reporting style or character (e.g., humorous, sports broadcaster, a cartoon character, etc.), a desired reporting length (e.g., time to read content, time to play audio track, etc.), whether the LLM reporting item is to be provided via text, via voice, via an avatar/deepfake (e.g., a two dimensional or three dimensional avatar or deepfake face) with a voice track, and the like. The user data may comprise an identification of the user fantasy team name, the team roster, the team league, etc.

At block 308, fantasy sport event data may be accessed from a database, feed, or otherwise. The sport event data may include data discussed elsewhere herein (e.g., new rosters, assignments of athletes to positions, points earned, trades, transactions, free agencies, waivers, scores at the end of scoring periods, playoff and championship game results, prizes and payouts, statistics and updates, keeper league activities, and/or fantasy sports social media postings) and/or other data.

For example, the results of a league draft may be retrieved from a draft data resource (e.g., a database, feed, a source specified via a URL, or other data source). Optionally, a draft label may be specified to retrieve results for a specific draft. The resource may include a list of draft picks including the overall number of the picks, the round number, the number of the pick in the round, the player picked, and the team that picked the player. In the instance where there is a salary cap draft, the resource may also include a record of the bids in the salary cap. The draft results may also contain a status element that indicates if the draft is in progress or is complete.

By way of further example, coach standings data from a fantasy journalist for a given league may be accessed from a coach data resource. Coach-related data (e.g., total coaching risks, correct decisions, total number of points in starting line divided by a maximum amount of points possible on the roster, and/or the like) may be provided for each team in a given league.

By way of further example, owner data for a given league may be accessed from an owner data resource. Owner-related data (e.g., sit start decisions, perfect lineups, and points gained/lost, and/or the like) may be provided for each team in a given league. By way of still further example, the following data may be retrieved:

- a game-by-game breakdown of a player's statistics for a season;
- the roster for a given fantasy team;
- the standings for a fantasy league for a specific period in ranked order (where optionally, the standings are not cumulative through a period, but are just for a specific period);
- the overall standings for a fantasy league;
- breakdown standings against opponents for a fantasy league (e.g., in the instances where leagues use a head-to-head scoring system as matchups and opponents only exist for head-to-head league) where the data may be broken down by actual standings against each opponent and by standings against each team if each team played every team each period;
- weekly scores for a fantasy league;
- live statistics for players; and/or
- statistics for a league for a specified timeframe, period, team identifier, team type, profession or fantasy, actual statistics, and/or projected statistics.

At block 310, a prompt may be generated, using the event data, user preferences, and/or user data. The prompt may optionally be generated by inputting event data, user preferences, and/or user data into a prompt template. At block 312, the prompt may be output to an LLM (or other such AI model). At block 314, the LLM may generate a textual response as described elsewhere herein. If the response is to be converted to voice, at block 316, the textual response is converted to voice (where the voice may have been one specified by the user via a preferences user interface). For example, the TTS service 208B described above may be utilized to perform the conversion. A deepfake algorithm may be utilized to make the voice simulate that of a real person (e.g., a sports broadcaster or other personality).

If an avatar or a deepfake of a real person's face is to be used to appear to speak the voice output from the TTS service, then at block 318 a corresponding avatar or deepfake may be generated to appear to lip sync the voice output. For example, the video service 210B may be used to generate an avatar or an image of a real person (e.g., a sports broadcast personality) that appears to speak the speech generated by the TTS service 208B.

!!!!! At block 320, a determination is made as to whether the response is to be provided to the user (e.g., via text, audio, and/or via an avatar/deepfake video). For example, the generated content may be automatically played to the user via the user device on a predetermined schedule, in a continuous loop, in response to a user opening a fantasy sports application or webpage, and/or in response to a user request (e.g., issued via activation of a corresponding control, a speech command, or otherwise). If a determination is made that the response is to be provided to the user, the audio/video response may be played via a player on the user device, or the text may be provided for display to the user device.

Optionally, the response may be inserted into other content, such as a podcast, a satellite news or music station, streaming audio/music content, and/or the like. For example, the response may be configured as and inserted into other content as a news/sports break. In this instance, a determination may be made as to the identify the user (e.g., via user identification data provided by a streaming application), and the identity of the user may be used to access the appropriate data points and to generate a prompt to the LLM. For example, SCTE-35 markers may be inserted into a content stream. An SCTE-35 marker may be utilized to signal a primary content event or an ancillary content event (e.g., content generated using an LLM such as an audio only or audio/video fantasy sports report). The SCTE-35 packets may be multiplexed with video and/or audio packets in the transport stream. The SCTE-35 packet may include a splice_info_section that may include a splice_insert to signal a splice event. When an out_of_network_indicator in the splice_info_section is set to 1, it signals switching from a program (primary content) to ancillary content (a cue out event). When the out_of_network_indicator is set to 0, it signals a switch back to the program (a cue in event). Thus, in response to detecting an SCTE-35 marker with an out_of_network_indicator in the splice_info_section is set to 1, the LLM generated content may be inserted.

Figure 4:
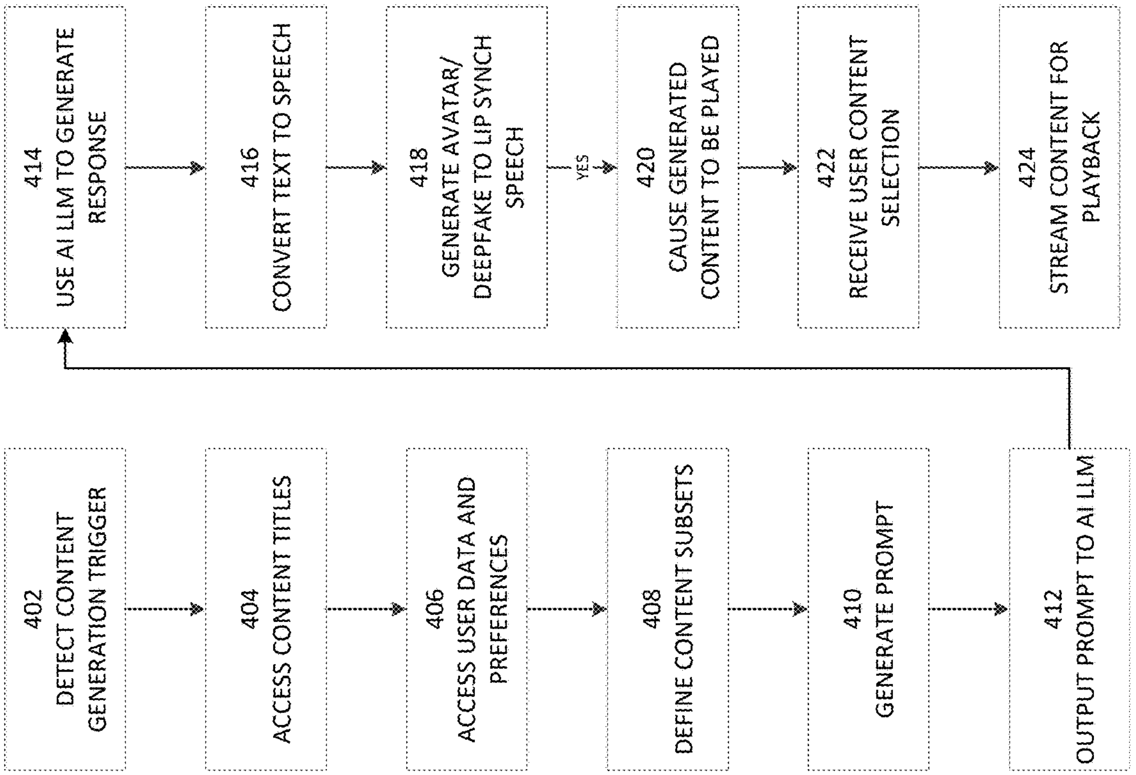
FIG. 4 illustrates another example process for generating content.

With respect to generating content recommendations, FIG. 4 illustrates an example process of generating content, such as content recommendations or suggestions for a user. The process may be executed in whole or in part via the systems disclosed herein, such as the content composer and content transmission system 104, the system 110 hosting the LLM, etc. The process may utilize an AI-driven chatbot. At block 402, a content generation trigger is detected. For example, the content generation trigger may be a request from a user received (e.g., as part of an interaction with a textual and/or animated chatbot) over a network for content suggestions/recommendations from a content provision service (e.g., configured to provide streaming video content and/or downloadable video content). As discussed elsewhere herein (see, e.g., the description of FIG. 5), a determination may be made as to whether the request is the same as or similar to a previous request/query, and if so, a saved response to the previous request may be provided to the user. By way of further example, the trigger may be a scheduled trigger (e.g., every day at a specified time), may be the user launching an application (such as a content streaming and/or download application), the user accessing a certain user interface of a content streaming/download application (e.g., a home page, a library page, an electronic program guide), or otherwise.

At block 404, some or all titles from a streaming/download content library may be accessed from memory. At block 406, user data and preferences may optionally be accessed from memory (e.g., a user profile). For example, the user data and preferences may include viewing history (e.g., already viewed content), average or median amount of time spent viewing streaming content per day, the amount of time spent viewing different genres of streaming/download content, and/or user-specified preferences (e.g., genres, specific items of content, actors, and/or the like), At block 408, optionally different content subsets may be defined. For example, content subsets may be defined for respective different categories (e.g., genres). By way of illustration 50, 100, or other number of titles per category may be selected. Optionally, one or more of the following factors may be utilized in selecting the subset of titles: a user request for content recommendation (e.g., which may specify a genre, mood, length, actor, availability time frame, and/or the like), popularity (e.g., number of views over a specified period of time, such as the current day, the past week, the past month, without a date restrictions, and/or the like), viewer ratings, dates respective items of content were first made available via the streaming/download system, user data and preferences (e.g., content already viewed by the user may be excluded, content with a preferred actor may be included), and/or the like.

At block 410, a prompt may be generated to be provided to an AI engine (e.g., an LLM). The prompt may identify the content subsets and may include a portion of or all of the user's request. For example, if the user request was "suggest some movies or shows that will cheer me up," the generated prompt to be provided to the AI engine may be as follows:

"Hi, congratulations, you're here to provide TV and movie recommendations to a VIP. You can pick from the following titles: {names of titles in the content subsets}

That's the end of the library of shows and movies you can use.

Answer in the voice of an old timey cartoon character and always put the titles of films in quotes. And please, only use films or shows from the above list-don't use anything else!

The recommendations should be selected to cheer up the VIP."

By way of further, if the user query was in the form of "Surprise me with a content recommendation," the query provided to the LLM may exclude the user's query, or the query provided to the LLM may include a phrase "provide random recommendations."

At block 412, the generated prompt is output to the AI engine (e.g., an LLM). The AI engine may be local or may be remotely executing on one or more servers. For example, the generated prompt may be transmitted over a network via a network. Interface to a system (e.g., a cloud-based system). executing the LLM (e.g., the LLM) generates a response (e.g., comprising content recommendations).

If a spoken version of the response is to be provided to the user, at block 416, the text is converted to speech using a text to speech service as described elsewhere herein. If a video version of the response is to be provided to the user via an avatar (e.g., a computer generated animated two or three dimensional character) and/or a deepfake of a real image of a person, at block 418, the animated avatar or deepfake is generated so as to lip sync the speech generated by the text to speech service and to optionally have expressions that sync with the speech. At block 420, the generated response is provided for display/reproductions on the user device. For example, a textual response may be transmitted to the user device for display, and/or the generated speech and/or avatar/deepfake are transmitted to the user device for playback.

The recommendations may include the title of the content item, images related to the content items (e.g., posters or frames from the content items), and/or video previews of the recommended content items. The user may then select a recommended content item. In response to the user selection, a respective content details page may be accessed and rendered on the user device. The details page may include a summary of the content item, one or more related images, time length, actors, director, and/or other details, to enable the user to examine their choice further. If the user decides she does not want to watch the selected content item, the user can return to the chat assistant (e.g., by activating a "Back" icon or by providing a verbal command). If, instead, the user wants to proceed to watch the selected content item, the user can press a play control (e.g., a watch now control) and the selected content item will begin playing on the user device.

At block 422, a user selection of an item of suggested content is received from the user device. At block 424, the selected item of content is streamed or downloaded from a content source (e.g., a content database or a live feed) to the user device, where it may be played back via a video player or other content player (e.g., executing on the user device).

An example process of utilizing cached queries will now be described with reference to FIG. 5. As similarly discussed elsewhere herein, user recommendation queries and prompts generated using user queries/requests may be cached in memory and in addition, recommendation responses from the AI engine (e.g., LLM) may be cached in association with the corresponding query. When a new query/request is received from a user, a determination may be made as to whether the same or similar query/request is stored in the cache, and if so, the corresponding cached AI engine response may be transmitted to the user device. This process may greatly reduce the number of queries passed to the AI service (e.g., LLM), and hence greatly reduce the load on and utilization of the computer resources (e.g., memory and processor resources) used to execute the AI engine. The process illustrated in FIG. 5 may be used in conjunction with the process illustrated in FIG. 4.

Figure 5:
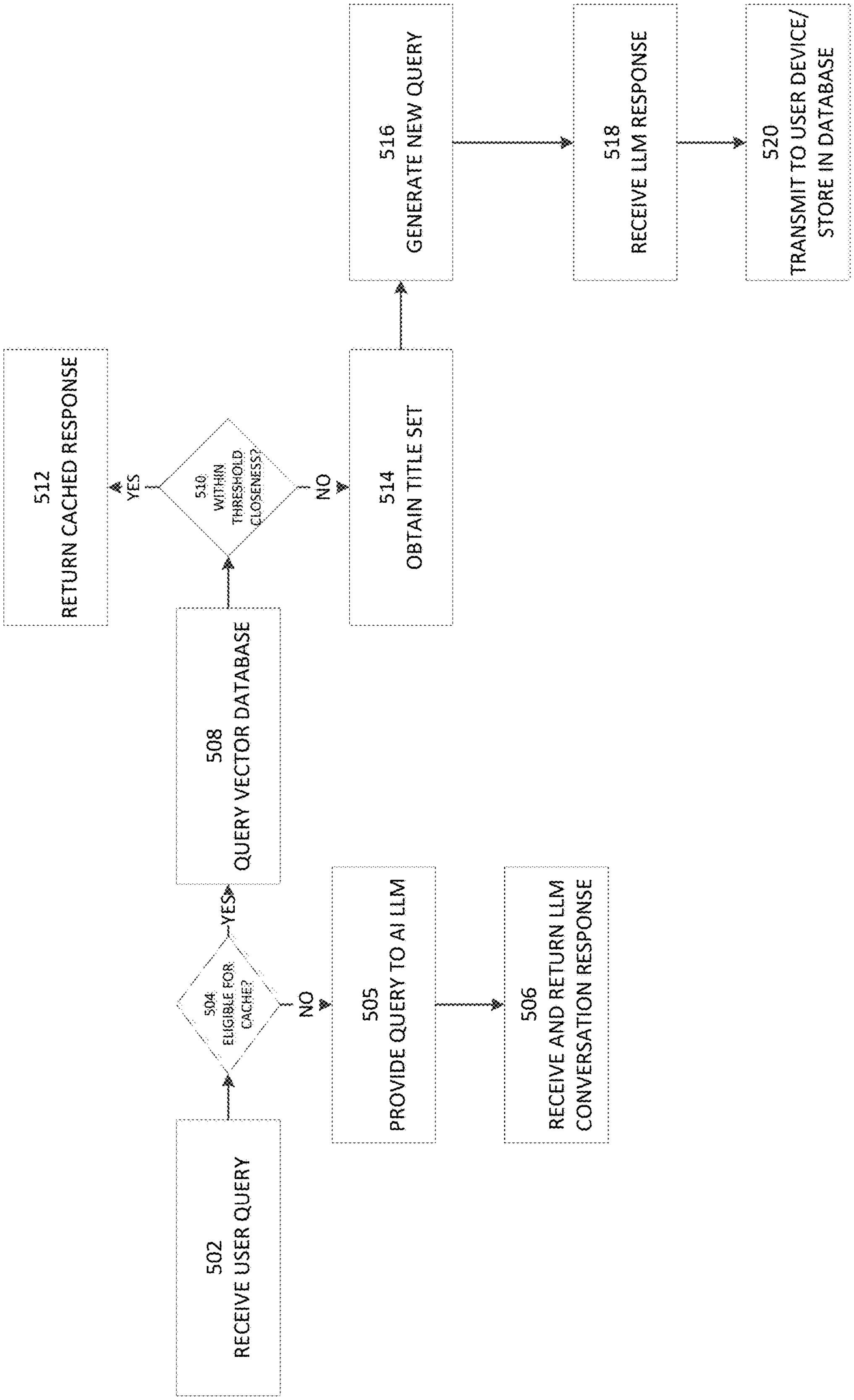
FIG. 5 illustrates an example process for caching queries.

Referring now to FIG. 5, at block 502, a user query/request for a content recommendation (e.g., for streaming or on demand content) is received (e.g., over a network via a network interface) from a user via a user device. Optionally, the query/request may be received via an interaction with a chatbot, as similarly described elsewhere herein. At block 504, a determination may be made as to whether the query/request is eligible for a cache lookup. For example, if the user query/request to the chatbot is unrelated to requesting a content recommendation, the query/request may not be eligible for a cache lookup. By way of illustration, the user query/request may relate to requesting a filmography of a director or actor, rather than requesting content recommendations, and so may not be eligible for a cache lookup.

If the query/request is not eligible for a cache lookup, at block 505, the query/request may be transmitted to the AI engine (e.g., LLM) without performing a cache lookup. At block 506, the query/request response from the AI engine may be received and transmitted to the user device for display and playback as similarly discussed above with respect to FIG. 4.

If a determination is made at block 504, that the query/request is a request for a content recommendation and is eligible to have a cache lookup performed, at block 508, a vector database is queried. For example, text embeddings for the query/request may be obtained from an embeddings model and the embeddings may be used to query/request the vector database to determine whether there are similar queries other users have asked for in the past and that are cached. The vector database enables a 'fuzzy search' to be performed on the meaning of a user query, so the user query/request does not have to have the exact words of a cached query/request in order for there to be a cache hit.

At block 510, a determination is made as to whether there is a cached query/request that is sufficiently close to the new user query. For example, the similarity (e.g., the distance) between the query/request vector and the vectors in the database may be calculated. Example similarity measures that may be used include cosine similarity, Euclidean distance, or Jaccard similarity. A similarity threshold may be set. For example, the threshold may be set based on the quality of the embeddings, and the trade-off between precision and recall.

Precision measures the accuracy of positive predictions and may be defined as the ratio of correctly predicted relevant items (true positives) to the total number of predicted relevant items (true positives+false positives). In other words, in this instance, precision indicates how many of the queries predicted as matches are actually relevant. Thus, high precision ensures that the results returned are highly relevant to the user's query, minimizing irrelevant results.

Precision may be calculated as:

Precision=True Positives/(True Positives+False Positives)

Recall measures the ability of the system to identify all relevant instances in the relevant dataset (e.g., the library content titles). Recall may be defined as the ratio of correctly predicted relevant items (true positives) to the total number of actual relevant items (true positives+false negatives). Recall indicates how many of the actual relevant items were found. For example, in the instant recommendation system, high recall ensures that the system suggests a large portion of relevant content items to the user, even if it means including some irrelevant content items.

Recall is calculated as:

Recall=True Positives/(True Positives+False Negatives)

The trade-off between precision and recall occurs because optimizing one often comes at the expense of the other.

The similarity score between the query/request vector and each vector in the database may be compared to the threshold. If the similarity score equals or exceeds the threshold for a given item in the cache, at block 512, the cached response (comprising content recommendations) corresponding to the matching cached query/request may be transmitted to the user device. Optionally, the response may be converted to voice and optionally, an animated avatar and/or a deepfake may be generated to lip-sync the speech, and the foregoing may be utilized to provide the content recommendations to the user as similarly discussed elsewhere herein.

????? If the similarity score fails to satisfy the threshold (e.g., is less than the threshold) indicating that there are not adequate query/request matches, then, at block 514, the relevant title set for content items may be accessed. For example, as similarly discussed elsewhere herein, the title set may include the complete library of content titles, an aggregation of subsets of titles from respective different categories, or the like. At block 516, query/request may be generated using the title set (and optionally user data and/or preferences), as similarly discussed elsewhere herein. The query/request may be provided to an AI engine (e.g., an LLM).

At block 518, the response may be received from the AI engine (e.g., the LLM). At block 520, the response may be transmitted to the user device. Optionally, the response, comprising content recommendations, may be converted to voice and optionally, an animated avatar and/or a deepfake may be generated to lip-sync the speech (and optionally facial expressions synchronized with the voice), and the foregoing may be utilized to provide the content recommendations to the user as similarly discussed elsewhere herein. The recommendations may include the title of the content item, images related to the content items (e.g., posters or frames from the content items), and/or video previews of the recommended content items. The user may then select a recommended content item. In response to the user selection, a respective content details page may be accessed and rendered on the user device. The details page may include a summary of the content item, one or more related images, time length, actors, director, and/or other details, to enable the user to examine their choice further. If the user decides she does not want to watch the selected content item, the user can return to the chat with the assistant (e.g., by activating a "Back" icon). If, instead, the user wants to proceed to watch the selected content item, the user can press a play control (e.g., a watch now control) and the selected content item will begin playing on the user device.

Optionally, if a threshold or more than a threshold number of content items are removed from the content library, such removal may be detected, and the query/request cache may be cleared (to ensure that stale queries that refer to no longer available content items). The query/request cache may be repopulated as new user queries are received and processed.

Optionally, after block 510, an additional layer may be utilized that checks multiple of the nearest neighbor cache results in case the second result is more relevant than the first one. Optionally, the results from the second layer are added to the results cache.

Optionally, a filter may be utilized before adding content titles to the vector database to avoid incorrect responses from the AI LLM that would otherwise recommend unavailable content titles. The filter may confirm that any titles that are to be added to the vector database are actually in the content library by parsing the result and searching the title list for matching titles.

Optionally, the query/request and response caches may be cleared periodically (e.g., every week, every month, every year) to ensure that there is sufficient memory space to accommodate new titles being added to the content library. Optionally, after the cache is cleared the cache may be warmed up (reloaded) with a set of common queries. Corresponding responses may also be stored to enable quick responses to user queries and to reduce system loading.

In addition to or instead of caching queries/requests, LLM generated responses may be cached. For example, if an LLM generated response relates to a fantasy sport, for certain responses (e.g., reporting a game results) the same response may be served to each member of a given fantasy football league or other set of users that would have the same scoring results (e.g., periodically, in response to a request, in response to a certain action being detected, or otherwise), thereby significantly reducing processor and computer member utilization.

Similarly, responses to prompts (e.g., narrative script with respect to fantasy sports) may be cached, where the same responses may be served to a predetermined set of users, such as users participating in the same league for certain subjects, such as league team performances. Optionally, the text output of an LLM and/or a speech version generated by a TTS may be cached and then served in response to detecting that the text output of an LLM and/or a speech version generated by a TTS are to be provided (e.g., streamed) to a member of the predetermined set of users.

Certain example user interfaces will now be described.

Figure 6:
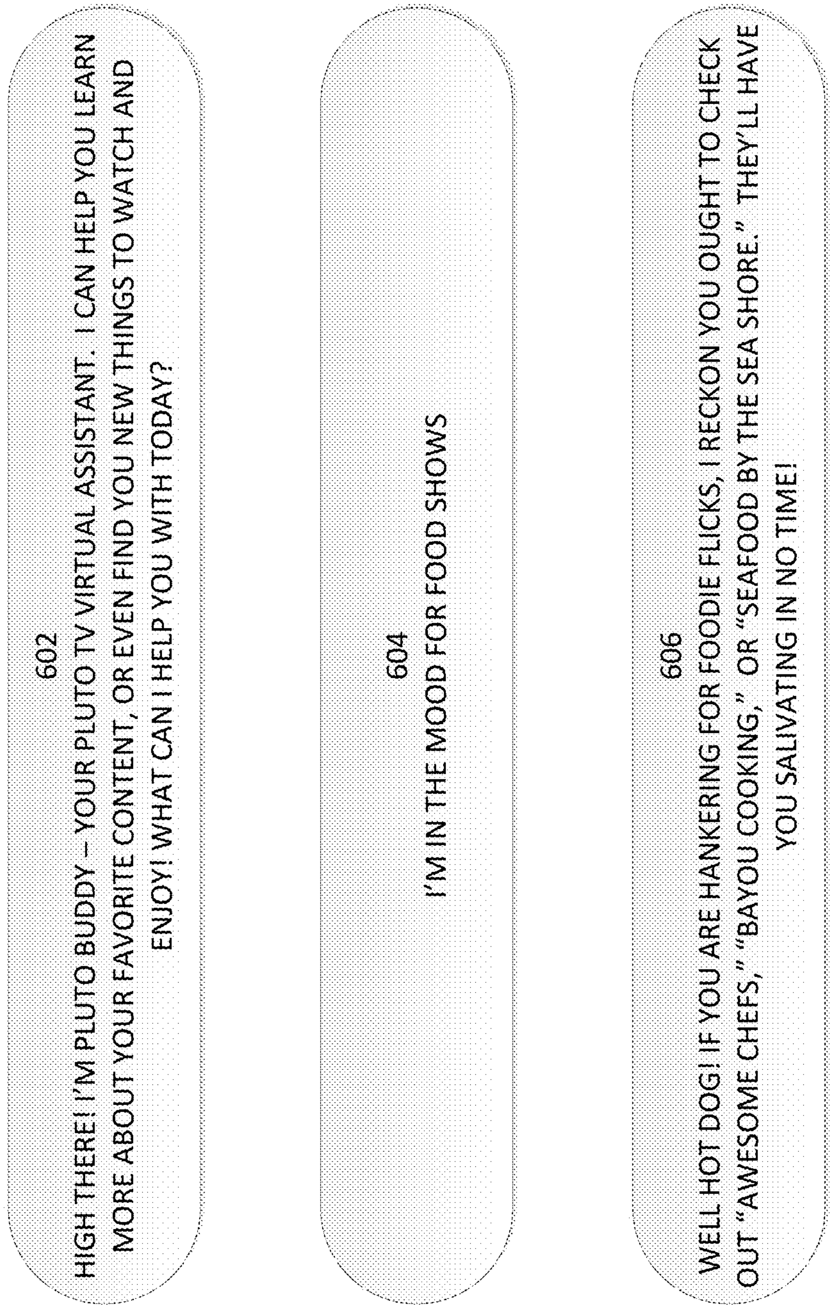
FIG. 6 illustrates an example AI chat user interface.

Referring to FIG. 6, a text-based recommendation assistant user interface is depicted. At field 602, the computerized assistant (e.g., an AI/LLM-powered chatbot), prompts the user to provide a request for assistance (e.g., for content recommendations). At field 604, a user text query has been entered ("I'm in the mood for food shows"). At field 606, an AI/LLM-generated response is rendered. The response may be generated as similarly discussed elsewhere herein.

Figure 7:
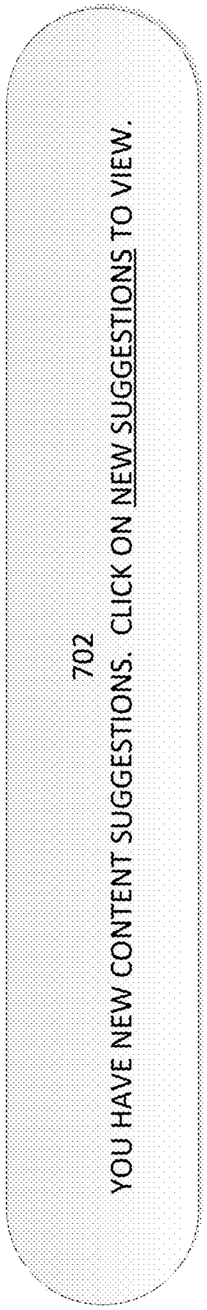
FIG. 7 illustrates an example notification user interface.

Optionally, even in the absence of a user query/request, content recommendations may be periodically generated and/or generated in response to certain user actions or events (e.g., the opening of a content streaming application, user navigating to a certain user interface, etc.). For example, a query/request may be periodically or in response to certain user actions or events be submitted to the AI/LLM. The query/request may be generated as similarly discussed elsewhere herein but may exclude a user query as none was present in this instance. FIG. 7 illustrates an example prompt 702 informing the user that there are new content suggestions for the user. The user may be instructed to select a link in order for the recommendations/suggestions to be provided to the user via the user device. If the user selects the link, the recommendations/suggestions are generated or retrieved from cache and provided to the user as similarly described elsewhere herein.

FIGS. 8A-8I illustrate example user interfaces depicting an animated assistant chatbot (which may be a three dimensional two dimensional avatar) in an immersive environment. The user interfaces may be rendered via a 2D display, via an augmented reality display/headset, or via a virtual reality display/headset. A hand/gesture tracking system may be utilized to receive user inputs. User inputs may also be received via a mouse, trackball, glide pad, microphone, or otherwise. The chatbot may be automatically initiated each time the user opens a streaming application or, as in this example, in response to a user command.

Figure 8A:
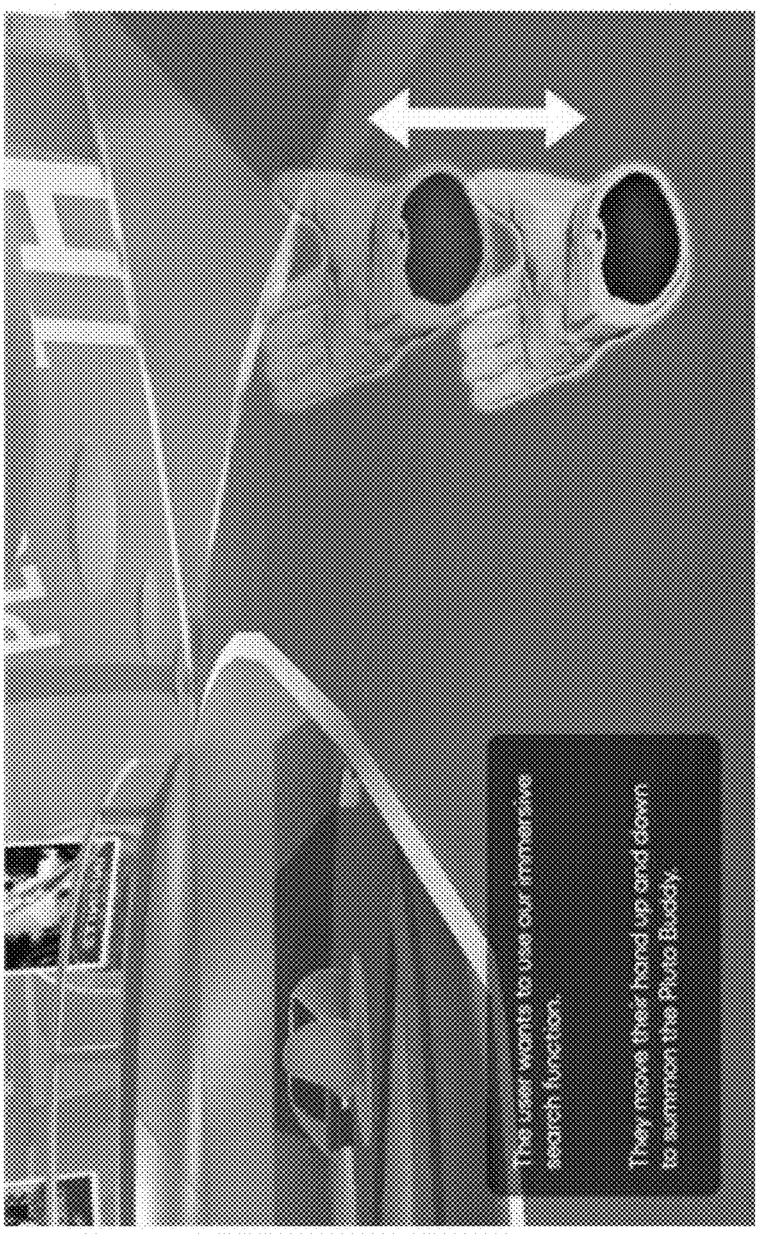
FIGS. 8A-8I illustrate example user interface.
Figure 8B:
Figure 8C:
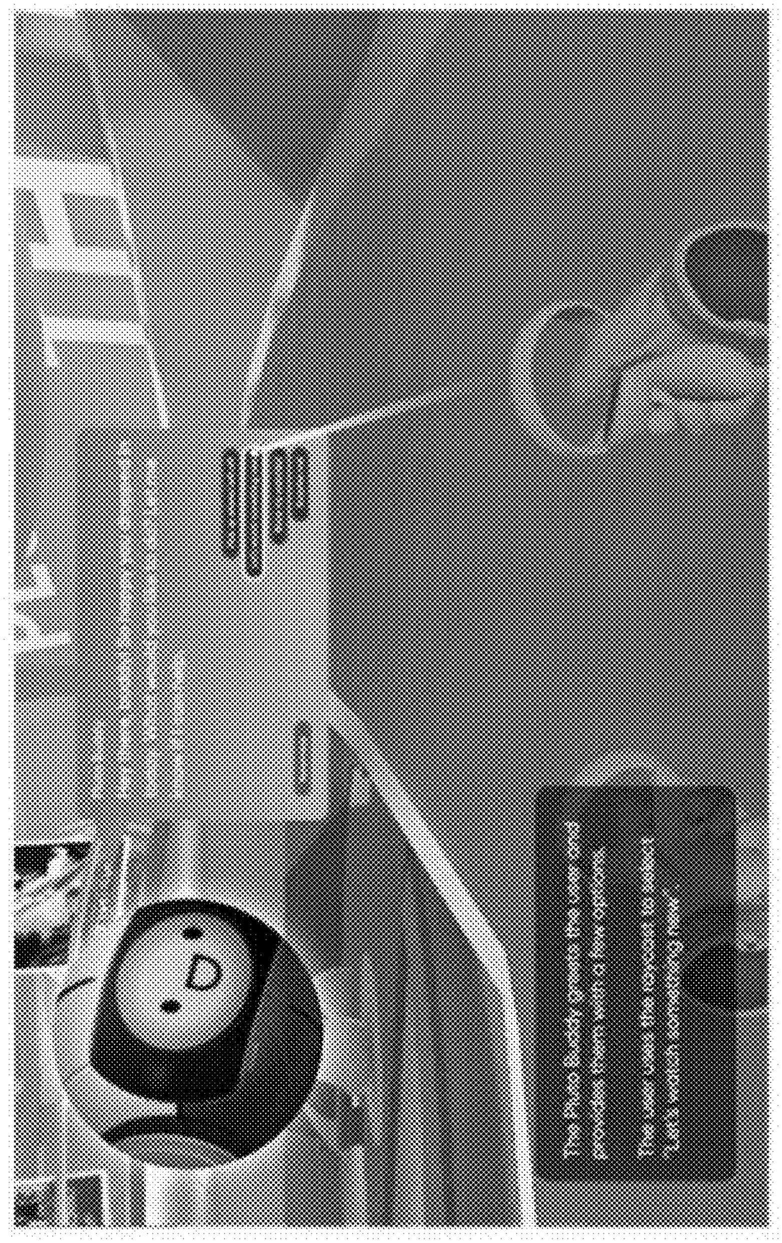

Referring to FIG. 8A, a user may move a hand or a virtual hand up and down to summon the computerized assistant. FIG. 8B depicts an animated virtual assistant that "flies" onto the display (e.g., the upper left hand corner of the user's point of view). FIG. 8C illustrates a text prompt presented to the user. The text prompt may be accompanied by a corresponding speech track and an animated mouth of the animated virtual assistant may be lip synced with the speech track. A prompt may be presented, (e.g., "Hey there buddy! So happy you dropped in today. What would you like to do? Let me know if I can help"). Optionally, the user may enter or speak a freeform query/instructions. Optionally, a set of options may be presented to the user from which the user may select. This approach may reduce the amount of processing power that would otherwise be needed to interpret the user's freeform query/instructions. For example, the set of options may include "pick up where I left off", "access watchlist," "surprise me," "let's watch something new." If the user selects "pick up where I left off', the system may initiate streaming the last content item the user was in the process of viewing, beginning at the point the user last stopped viewing. If the user selects "access watchlist," a watchlist of the user (in which the user has added content items for later viewing) may be accessed and displayed to the user via the user device. If the user selects "surprise me" the system may randomly or semi-randomly a content item and may stream the content item to the user device.

Figure 8D:
Figure 8E:
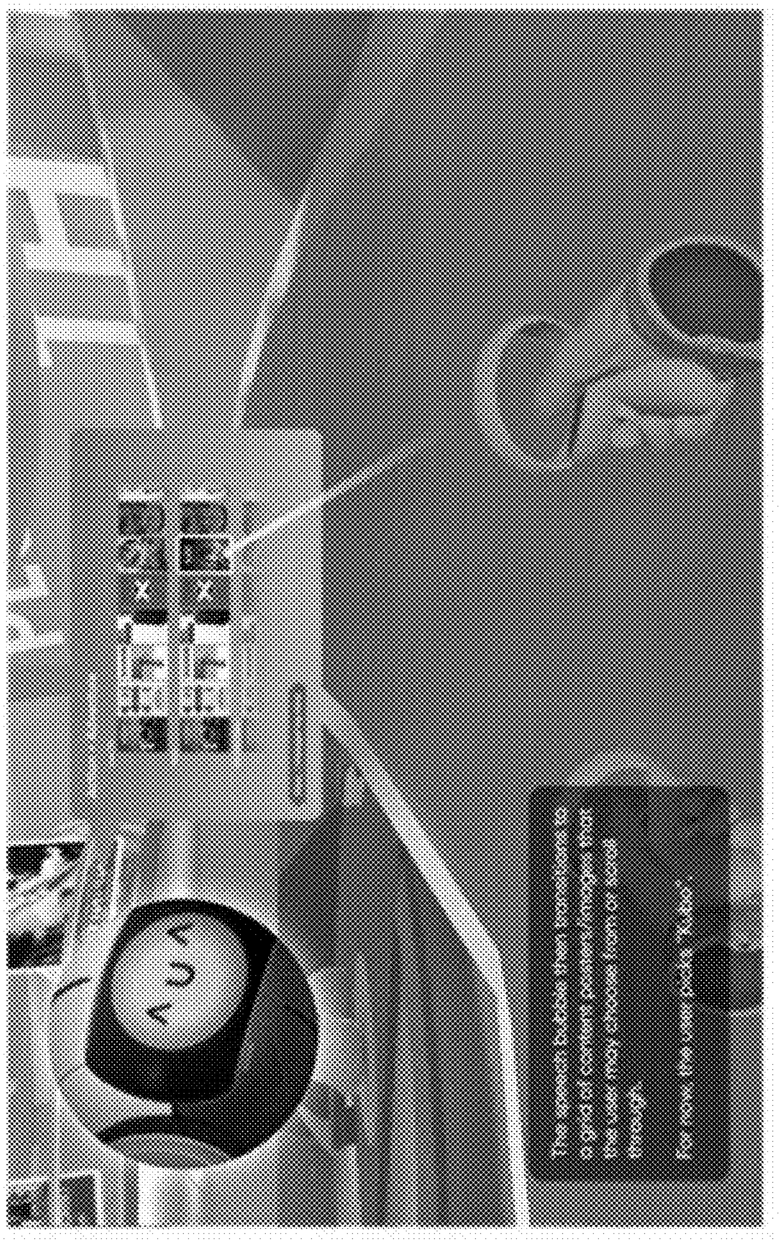
Figure 8F:
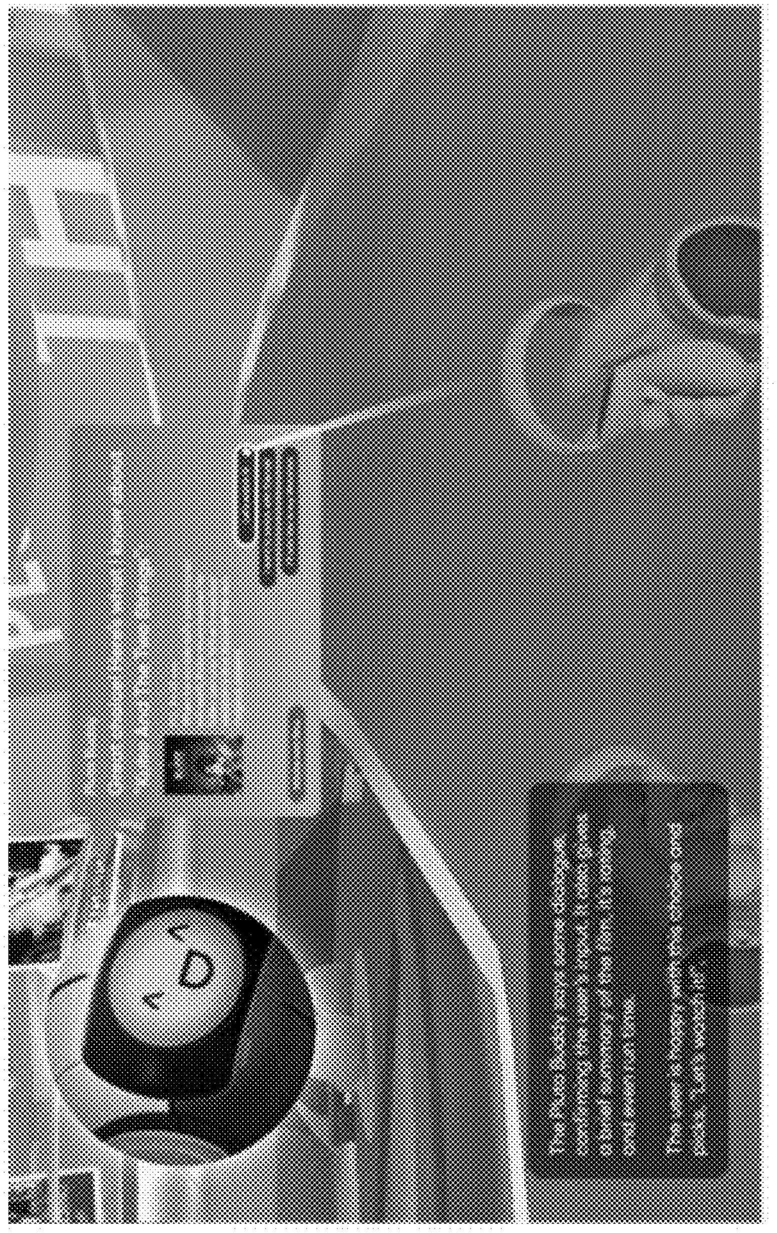

If the user selects "let's watch something new," the example user interface depicted in FIG. 8D may be presented. The electronic assistant may provide a response (e.g., "Of course! We have a lot of really cool stuff to choose from. Take a look!"). A number of categories/genres may be textually (and/or optionally graphically) presented to the user from which the user may select (e.g., action/adventure, crime, romance, comedy, thrillers, kids, etc.).

In response to the user selecting a category (e.g., action/adventure), the example user interface depicted in Figure SE may be presented. A grid of content item posters/images for the selected category may be displayed. The user may select one of the presented content items by selecting the corresponding poster/image. In response to the user selecting one of the presented content items by selecting the corresponding poster/image, the example user interface depicted in FIG. 8F may be presented. The assistant may confirm (textually and/or audibly) the user's selection. In addition, the assistant may provide (textually and/or audibly) a summary of the content item, its rating, its run time, and/or other related information. In response to the user confirming (e.g., by activating a corresponding control) the content item selection, the example user interface depicted in FIG. 8G may be presented.

Figure 8G:
Figure 8H:
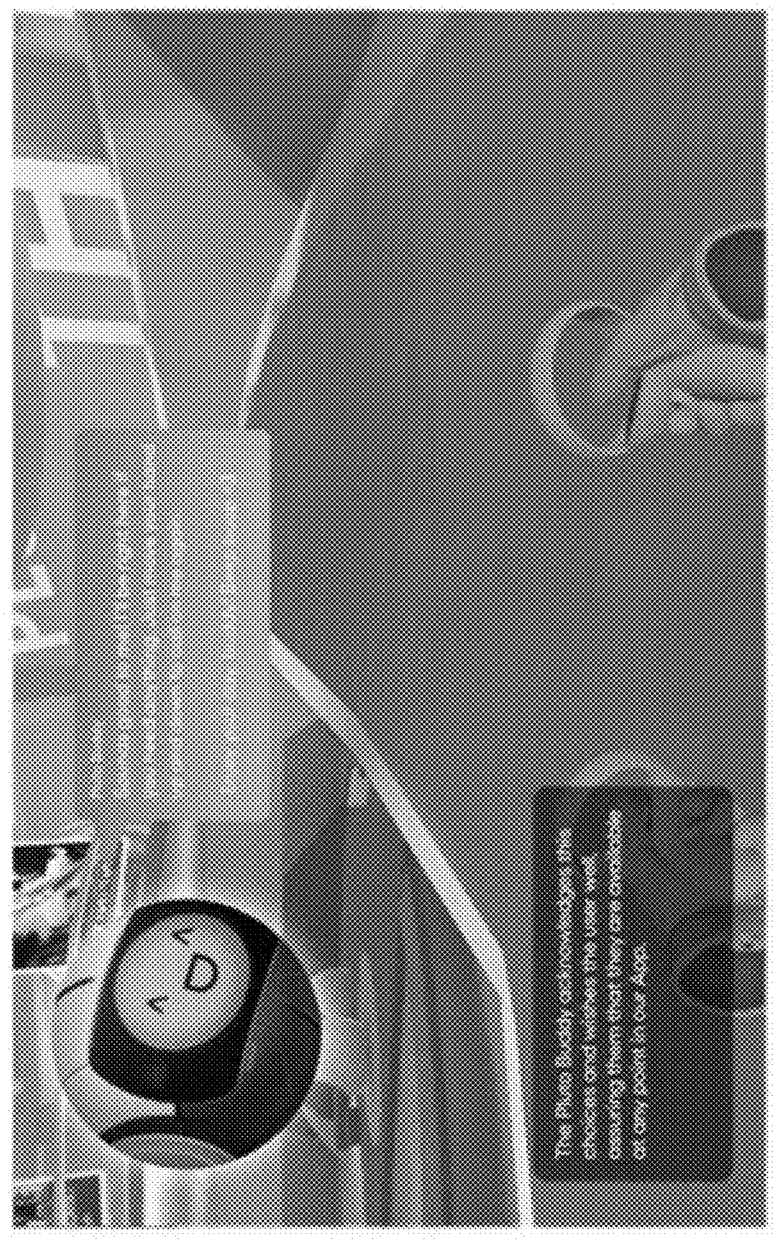
Figure 8I:

Referring to FIG. 8G, the content item selection may be played, and overlaying the content item or positioned to one side of the content item, the animated assistant may be presented asking the user if the user needs any additional assistance. In response to the user selecting or activating a "no thanks" control, the example user interface illustrated in 8H may be presented, in which the animated assistant informs the user that the user may ask the assistant to perform a task or otherwise respond to the user at any time. Referring to FIG. 8I, the animated assistant may visually "fly" off the user interface and the user may view the selected content unobstructed, in full screen mode.

Thus, an aspect of the present disclosure relates to generating dynamic content, customized for a given user, using a learning engine, such as a large language model. Another aspect of the present disclosure relates to generating customized content recommendations, thereby greatly reducing the number of user interfaces a user needs to navigate through. Still another aspect of the present disclosure relates to utilizing cached queries to greatly reduce the utilization of computer resources and to provide faster responses to user queries.

An aspect of the present disclosure relates to a system configured to provide distribution of streaming content over a network, the system comprising: a computer device; a network interface; non-transitory computer readable memory having program instructions stored thereon that when executed by the computer device cause the system to perform operations comprising: receive over a network via the network interface a first request or query from a first device associated with a first user; determine, with respect to the received first request or query, whether there is a same or similar request or query stored in memory by at least: converting the received first request or query to a first vector; performing a similarity search between the first vector of the received request or query and vectors stored in a vector database corresponding to previously received queries or requests; determining a distance between the first vector of the first received request or query and at least a second vector stored in the vector database corresponding to a corresponding previously received request or query; based at least in part on the determined distance between the first vector of the received first request or query and the second vector stored in the vector database corresponding to the corresponding previously received request or query, determining if the second vector stored in the vector database corresponding to the corresponding previously received request or query is sufficiently close to the first vector of the received first request or query based at least in part on a first metric; at least partly in response to determining that the second vector stored in the vector database corresponding to the corresponding previously received request or query is sufficiently close to the first vector of the received first request or query, accessing a response previously provided in response to the corresponding previously received request or query; transmit the accessed response, previously provided in response to the corresponding previously received request or query, to the first device associated with the first user, in response to the first request or query; receive over the network via the network interface a second request or query from a second device associated with a second user; determine, with respect to the received second request or query, whether there is a same or similar request or query stored in memory by at least: converting the received second request or query to a third vector; performing a similarity search between the third vector of the received second request or query and vectors stored in the vector database corresponding to previously received queries or requests; determining a distance between the third vector of the received second request or query and at least a fourth vector stored in the vector database corresponding to a corresponding previously received request or query; based at least in part on the determined distance between the third vector of the received second request or query and the fourth vector stored in the vector database corresponding to the corresponding previously received request or query, determining if the fourth vector stored in the vector database corresponding to the corresponding previously received request or query is sufficiently close to the third vector of the received second request or query; at least partly in response to determining that the fourth vector stored in the vector database corresponding to the corresponding previously received request or query is not sufficiently close to the third vector of the received second request or query, generate a prompt, comprising at least a portion of the second request or query, a set of titles corresponding to content items in a content library, and at least a first instruction, to a large language model; receive a prompt response from the large language model; and transmit the prompt response to the second device.

Optionally, the system is configured to clear at least a portion of the vector database in response to determining that at least a threshold number of content items have been deleted from the content library. Optionally, the prompt response from the large language model comprises text, and the system is configured to use a text to speech service to convert the prompt response to speech and generate an animated entity or a deepfake configured to lip sync the speech. Optionally, the system is configured to select respective subsets of titles from respective different categories of content items in the content library, aggregate the respective subsets of titles, wherein the set of titles corresponding to content items in the content library comprises the aggregated respective subsets of titles. Optionally, the prompt response from the large language model comprises content recommendations selected from only the set of titles corresponding to content items in a content library. Optionally, the prompt specifies a response style preference of the second user. Optionally, the system is configured to utilize a virtual assistant that uses at least one large language model to converse with at least one user. Optionally, the large language model comprises an encoder and a decoder, connected through one or more multi-head attention and feedforward layers.

An aspect of the present disclosure relates to a computer implemented method, the method comprising: instantiating a virtual assistant configured to utilize a large language model to converse with users; using the virtual assistant to ask a user, via a user device, whether the user needs assistance; receiving over a network from the user device a request from the user for content recommendations, wherein the request comprises a category specification and/or a mood specification; selecting respective subsets of content titles of different categories of content from a content library comprising a plurality of titles; aggregating the respective subsets of content titles of different categories of content; generating a prompt comprising at least a portion of the user request, the aggregated respective subsets of content titles of different categories of content, and an instruction to generate content recommendations using only the aggregated respective subsets of content titles of different categories of content; providing the prompt comprising the at least a portion of the user request, the aggregated respective subsets of content titles of different categories of content, and the instruction to generate content recommendations using only the aggregated respective subsets of content titles of different categories of content to a large language model; receiving, from the large language model, a response; and transmitting the response over the network to the user device.

Optionally, the prompt response from the large language model comprises text, the method further comprising using a text to speech service to convert the prompt response to speech and generate an animated entity or a deepfake configured to lip sync the speech. Optionally, the large language model comprises an encoder and a decoder, connected through one or more multi-head attention and feed-forward layers. Optionally, the method further comprises, prior to transmitting the generated prompt to the large language model, converting the received request to a first vector; performing a similarity search between the first vector of the received request and vectors stored in a vector data store corresponding to previously received requests; determining a similarity of the first vector of the received request and at least a second vector stored in the vector data store corresponding to a previously received request using cosine similarity, Euclidean distance, and/or Jaccard similarity; based at least in part on the determined similarity between the first vector of the received request and the second vector stored in the vector data store corresponding to the previously received request, determining if the second vector stored in the vector data store corresponding to the previously received request is sufficiently similar to the first vector of the received request; at least partly in response to determining that the second vector stored in the vector data store corresponding to the previously received request is not sufficiently similar to the first vector of the received request, generating the prompt. Optionally, the method further comprises, prior to transmitting the generated prompt to the large language model, converting the received request to a first vector; performing a similarity search between the first vector of the received request and vectors stored in a vector data store corresponding to previously received requests; determining a distance between the first vector of the received request and at least a second vector stored in the vector data store corresponding to a previously received request; based at least in part on the determined distance between the first vector of the received request and the second vector stored in the vector data store corresponding to the previously received request, determining if the second vector stored in the vector data store corresponding to the previously received request is sufficiently close to the first vector of the received request; and at least partly in response to determining that the second vector stored in the vector data store corresponding to the previously received request is not sufficiently close to the first vector of the received request, generating the prompt. Optionally, the method further comprises: maintaining in memory a cache of previously received requests for content recommendations; detecting that at least a first threshold number of content items are no longer available in the content library; and at least partly in response to detecting that the at least first threshold number of content items are no longer available in the content library, clearing at least a portion of the cache. Optionally, the prompt response from the large language model comprises text, the method further comprising using a text to speech service to convert the prompt response to speech and generate an animated entity or a deepfake configured to lip sync the speech. Optionally, the prompt response from the large language model comprises content recommendations selected from only the aggregated respective subsets of content titles of different categories of content. Optionally, the prompt specifies a response style preference of the user.

An aspect of the present disclosure relates to a system configured to provide distribution of streaming content over a network, the system comprising: a computer device; a network interface; non-transitory computer readable memory having program instructions stored thereon that when executed by the computer device cause the system to perform operations comprising: determine that a first type of content is to be generated for a first user; select a prompt template based at least in part on the determined first type of content; access a plurality of data points from one or more data sources; populate the selected prompt template, selected based at least in part on the determined first type of content, with the plurality of prompts; generate a prompt comprising the populated prompt template and at least one style instruction; provide the prompt comprising the populated prompt template and at least one style instruction to a large language model; receive a response comprising a narrative script comprising the data points in a style corresponding to the at least one style instruction; use a text-to-speech engine to convert the narrative script, comprising the data points in the style corresponding to the at least one style instruction, to speech; and stream the speech, comprising data points in the style corresponding to the at least one style instruction, to a device associated with the first user.

Optionally, the operations further comprise: cache the narrative script and/or the speech; transmit the narrative script and/or the speech to the device associated with the first user at least partly in response to detecting a first event. Optionally, the operations further comprise: generate an animated avatar configured to lip sync the speech using at least one of the following models: a Latent Diffusion Model; a Conditional Variational Autoencoder; a Generative Adversarial Network; a Sequence-to-Sequence Model; wherein a given model is trained using a dataset with pairs of textual descriptions and corresponding video sequences, and wherein training comprises reducing a difference between video frames generated by the given model and corresponding ground truth frames from the dataset utilizing a loss function. Optionally, the operations further comprise: detect the device associated with the first user receiving a first item of content; and in response to detecting an insertion marker in the first item of content, cause the speech to be transmitted to the device associated with the first user at a position indicated by the insertion marker. Optionally, the operations further comprise: cause the generated prompt to be repeatedly resubmitted to the large language model at a specified time interval to generate corresponding updated narrative scripts; use the text-to-speech engine to convert a given updated narrative script to updated speech; stream the updated speech to a device associated with the first user.

An aspect of the present disclosure relates to a computer implemented method, the method comprising: determining that a first type of content is to be generated for a first user; selecting a prompt template based at least in part on the determined first type of content; accessing a plurality of data points from one or more data sources; populating the selected prompt template, selected based at least in part on the determined first type of content, with the plurality of prompts; generating a prompt comprising the populated prompt template and at least one style instruction; providing the prompt comprising the populated prompt template and at least one style instruction to a large language model; receiving a response comprising a narrative script comprising the data points in a style corresponding to the at least one style instruction; using a text-to-speech engine to convert the narrative script, comprising the data points in the style corresponding to the at least one style instruction, to speech; and transmitting the speech, comprising data points in the style corresponding to the at least one style instruction, to a device associated with the first user.

Optionally, the method further comprises: caching the narrative script and/or the speech; transmitting the narrative script and/or the speech to the device associated with the first user at least partly in response to detecting a first event. Optionally, the method further comprises: generating an animated avatar configured to lip sync the speech using at least one of the following models: a Latent Diffusion Model; a Conditional Variational Autoencoder; a Generative Adversarial Network; a Sequence-to-Sequence Model; wherein a given model is trained using a dataset with pairs of textual descriptions and corresponding video sequences, and wherein training comprises reducing a difference between video frames generated by the given model and corresponding ground truth frames from the dataset utilizing a loss function. Optionally, the method further comprises: detecting the device associated with the first user receiving a first item of content; and in response to detecting an insertion marker in the first item of content, causing the speech to be transmitted to the device associated with the first user. Optionally, the method further comprises: causing the generated prompt to be repeatedly resubmitted to the large language model at a specified time interval to generate corresponding updated narrative scripts; using the text-to-speech engine to convert a given updated narrative script to updated speech; streaming the updated speech to a device associated with the first user.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to provide distribution of streaming content over a network, the system comprising:

a computer device;

a network interface;

non-transitory computer readable memory having program instructions stored thereon that when executed by the computer device cause the system to perform operations comprising:

store a video content library of video content items and associated video content item titles;

receive a voice specification from a first user;

select a first subset of titles from a first genre based at least in part on a determined popularity of titles in the first genre;

select a second subset of titles from a second genre based at least in part on a determined popularity of titles in the second genre;

generate an aggregated subset of titles comprising the first subset of titles and the second subset of titles;

receive over a network via the network interface a first request or query from a first device associated with a first user;

determine, with respect to the received first request or query, whether there is a same or similar request or query stored in memory by at least:

converting the received first request or query to a first vector;

performing a similarity search between the first vector of the received request or query and vectors stored in a vector database corresponding to previously received queries or requests;

determining a distance between the first vector of the first received request or query and at least a second vector stored in the vector database corresponding to a corresponding previously received request or query;

based at least in part on the determined distance between the first vector of the received first request or query and the second vector stored in the vector database corresponding to the corresponding previously received request or query, determining if the second vector stored in the vector database corresponding to the corresponding previously received request or query is sufficiently close to the first vector of the received first request or query based at least in part on a first metric;

at least partly in response to determining that the second vector stored in the vector database corresponding to the corresponding previously received request or query is sufficiently close to the first vector of the received first request or query, accessing a response previously provided in response to the corresponding previously received request or query, the response including video content viewing recommendations comprising a first plurality of titles of video content items in a first category of the video content library of video content items satisfying at least one popularity metric and comprising a second plurality of titles of video content items in a second category of the video content library of video content items satisfying at least one popularity metric;

convert the accessed response, comprising text, to a voice response in accordance with the user voice specification using a deep learning engine;

transmit the voice response converted from the accessed response in accordance with the user specification, in response to the first request or query;

receive over the network via the network interface a second request or query from a second device associated with a second user, the second request or query comprising a content recommendation request or query;

determine, with respect to the received second request or query, whether there is a same or similar request or query stored in memory by at least:

converting the received second request or query to a third vector;

performing a similarity search between the third vector of the received second request or query and vectors stored in the vector database corresponding to previously received queries or requests;

determining a distance between the third vector of the received second request or query and at least a fourth vector stored in the vector database corresponding to a corresponding previously received request or query;

based at least in part on the determined distance between the third vector of the received second request or query and the fourth vector stored in the vector database corresponding to the corresponding previously received request or query, determining if the fourth vector stored in the vector database corresponding to the corresponding previously received request or query is sufficiently close to the third vector of the received second request or query;

at least partly in response to determining that the fourth vector stored in the vector database corresponding to the corresponding previously received request or query is not sufficiently close to the third vector of the received second request or query, generate a prompt, comprising at least a portion of the second request or query, the aggregated subsets of titles, an identification of content items the user has begun watching, an identification of content items the user has completed watching, and at least a first instruction, to a large language model trained using a corpus of text comprising content reviews;

receive a prompt response from the large language model, comprising a content recommendation comprising one or more items of content selected from the aggregated subsets of titles;

transmit the prompt response, comprising the content recommendation comprising one or more items of content selected from the aggregated subsets of titles, the content recommendations comprising previews of at least one of the one or more items of content to the second device;

receiving a request from the second device for an item of content from the content recommendation;

in response to the request from the second device for the item of content from the content recommendation transmitting a corresponding manifest to the second device;

determine that a threshold amount of modifications have been made to the video content library; and at least partly in response to determining that the threshold amount of modifications have been made to the video content library, clear a cache of queries.

2. The system as defined in claim 1, wherein the system is configured to clear at least a portion of the vector database in response to determining that at least a threshold number of content items have been deleted from the video content library.

3. The system as defined in claim 1, wherein the prompt response from the large language model comprises text, and the system is configured to use a text to speech service to convert the prompt response to speech and generate an animated entity or a deepfake configured to lip sync the speech.

4. The system as defined in claim 1, wherein the system is configured to periodically clear the cache of previously received requests and corresponding content recommendation responses and, after clearing, to warm up the cache by loading a set of common queries with corresponding content recommendation responses.

5. The system as defined in claim 1, wherein the prompt response from the large language model comprises text, and the system is configured to convert the prompt response to speech comprising generating prosodic information including pitch contours, duration, and loudness variations.

6. The system as defined in claim 1, wherein the prompt specifies a response style preference of the second user.

7. The system as defined in claim 1, wherein the system is configured to utilize a virtual assistant that uses at least one large language model to converse with at least one user.

8. The system as defined in claim 1, wherein the large language model comprises an encoder and a decoder, connected through one or more multi-head attention and feed-forward layers.

9. A computer implemented method, the method comprising:

enabling a user to specify a style for a virtual assistant configured to provide video content recommendations;

storing a video content library of video content items and associated video content item titles;

instantiating the virtual assistant comprising a deepfake character and configured to utilize a large language model to converse with users regarding video content in a user-specified style;

using the virtual assistant comprising the deepfake character to ask the user, via a user device, whether the user needs assistance;

receiving over a network from the user device a request from the user for video content recommendations, wherein the request comprises a mood specification for the video content recommendations;

select a first subset of titles from a first genre based at least in part on a determined popularity of titles in the first genre;

select a second subset of titles from a second genre based at least in part on a determined popularity of titles in the second genre;

generate an aggregated subset of titles comprising the first subset of titles and the second subset of titles;

generating a prompt comprising at least a portion of the user request comprising the mood specification for the video content recommendations, the aggregated subset of titles, an identification of content items the user has begun watching, an identification of content items the user has completed watching, and an instruction to generate video content recommendations using the aggregated subset of the titles;

providing the prompt comprising the user-specified style, the at least a portion of the user request, the aggregated subset of titles, the identification of content items the user has begun watching, the identification of content items the user has completed watching, and the instruction to generate content recommendations using the aggregated subset of titles to a large language model;

receiving, from the large language model, a response comprising recommended video content items from the video content library of video content items in accordance with the user-specified style; and transmitting the response comprising recommended video content items from the video content library of video content items in accordance with the user-specified style over the network to the user device;

receiving a request from the user device for an item of content from the recommended video content items;

at least partly in response to the request from the user device for the item of content from the recommended video content items transmitting a corresponding manifest to the user device.

10. The method as defined in claim 9, wherein the prompt response from the large language model comprises text, the method further comprising using a text to speech service to convert the prompt response to speech wherein the deepfake character is configured to lip sync the speech.

11. The method as defined in claim 9, wherein the large language model comprises an encoder and a decoder, connected through one or more multi-head attention and feed-forward layers.

12. The method as defined in claim 9, the method further comprising, prior to transmitting the generated prompt to the large language model, converting the received request to a first vector;

performing a similarity search between the first vector of the received request and vectors stored in a vector data store corresponding to previously received requests;

determining a similarity of the first vector of the received request and at least a second vector stored in the vector data store corresponding to a previously received request using at least one of cosine similarity, Euclidean distance, or Jaccard similarity;

based at least in part on the determined similarity between the first vector of the received request and the second vector stored in the vector data store corresponding to the previously received request, determining if the second vector stored in the vector data store corresponding to the previously received request is sufficiently similar to the first vector of the received request;

at least partly in response to determining that the second vector stored in the vector data store corresponding to the previously received request is not sufficiently similar to the first vector of the received request, generating the prompt.

13. The method as defined in claim 9, the method further comprising, prior to transmitting the generated prompt to the large language model, converting the received request to a first vector;

performing a similarity search between the first vector of the received request and vectors stored in a vector data store corresponding to previously received requests;

determining a distance between the first vector of the received request and at least a second vector stored in the vector data store corresponding to a previously received request;

based at least in part on the determined distance between the first vector of the received request and the second vector stored in the vector data store corresponding to the previously received request, determining if the second vector stored in the vector data store corresponding to the previously received request is sufficiently close to the first vector of the received request; and at least partly in response to determining that the second vector stored in the vector data store corresponding to the previously received request is not sufficiently close to the first vector of the received request, generating the prompt.

14. The method as defined in claim 9, the method further comprising:

maintaining in memory a cache of previously received requests for content recommendations;

detecting that at least a first threshold number of content items are no longer available in the content library; and at least partly in response to detecting that the at least first threshold number of content items are no longer available in the content library, clearing at least a portion of the cache.

15. The method as defined in claim 9, the method further comprising periodically clearing a cache of previously received requests and corresponding content recommendation responses and, after clearing, warming up the cache by loading a set of common queries with corresponding content recommendation responses.

16. The method as defined in claim 9, wherein the prompt response from the large language model comprises content recommendations selected from only the aggregated respective subsets of content titles of different categories of content.

17. The method as defined in claim 9, wherein the prompt response from the large language model comprises text, the method further comprising converting the prompt response to speech comprising generating prosodic information including pitch contours, duration, and loudness variations.

* * * * *